(12) United States Patent  (10) Patent No.: US 10,887,801 B2
Hong  (45) Date of Patent: Jan. 5, 2021

(54) METHOD FOR IMPLEMENTING EDGE COMPUTING OF NETWORK AND DEVICE THEREOF

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/726,867

(22) Filed: Dec. 25, 2019

(65) Prior Publication Data
US 2020/0137642 A1  Apr. 30, 2020

Related U.S. Application Data

(63) Continuation of application No. PCT/CN2017/091053, filed on Jun. 30, 2017.

(51) Int. Cl.
*H04W 48/18* (2009.01)
*H04W 36/00* (2009.01)

(52) U.S. Cl.
CPC ... *H04W 36/0022* (2013.01); *H04W 36/0061* (2013.01); *H04W 48/18* (2013.01)

(58) Field of Classification Search
CPC ......... H04W 36/0022; H04W 36/0027; H04W 36/0033; H04W 36/0055; H04W 36/0061;
(Continued)

(56) References Cited

U.S. PATENT DOCUMENTS

2003/0202487 A1* 10/2003 Harris ................. H04W 76/45
  370/329
2008/0261577 A1* 10/2008 Celik .................... H04W 4/08
  455/416
(Continued)

FOREIGN PATENT DOCUMENTS

CN   1731757 A   2/2006
CN   101754054 A   6/2010
(Continued)

OTHER PUBLICATIONS

International Search Report in the international application No. PCT/CN2017/091053, dated Mar. 27, 2018.
(Continued)

*Primary Examiner* — Jean A Gelin
(74) *Attorney, Agent, or Firm* — Syncoda LLC; Feng Ma

(57) ABSTRACT

A method for implementing edge computing of a network and being performed by a base station includes: transmitting a notification signaling to a terminal after obtaining a target result; and receiving a first obtaining request transmitted, in response to the notification signaling, by the terminal. The notification signaling can be used to notify the terminal of the target result and the target result is used to indicate network edge computing capabilities, provided by the base station, including a capability of serving current service of the terminal. The first obtaining request can be used to obtain service data corresponding to the current service; transmitting the service data to the terminal in response to the first obtaining request.

14 Claims, 26 Drawing Sheets

(58) Field of Classification Search
CPC .. H04W 36/0072; H04W 48/18; H04L 29/08; H04L 29/08009; H04L 45/00; H04L 47/00; H04L 5/0053
See application file for complete search history.

(56) References Cited

U.S. PATENT DOCUMENTS

| | | | | |
|---|---|---|---|---|
| 2010/0157887 | A1* | 6/2010 | Kopplin | H04L 47/10 |
| | | | | 370/328 |
| 2012/0028618 | A1* | 2/2012 | Goel | H04W 36/385 |
| | | | | 455/414.1 |
| 2014/0324972 | A1* | 10/2014 | Zhang | H04L 67/26 |
| | | | | 709/204 |
| 2015/0022620 | A1* | 1/2015 | Siminoff | H04N 7/186 |
| | | | | 348/14.02 |
| 2015/0237577 | A1* | 8/2015 | Zhang | H04L 5/0053 |
| | | | | 370/311 |
| 2016/0088420 | A1* | 3/2016 | Kim | H04W 4/70 |
| | | | | 370/328 |
| 2016/0242019 | A1* | 8/2016 | Vanderveen | H04W 8/005 |
| 2017/0078922 | A1* | 3/2017 | Raleigh | H04W 28/10 |
| 2017/0214679 | A1* | 7/2017 | Lin | H04W 4/14 |
| 2019/0364492 | A1* | 11/2019 | Azizi | H04W 52/0264 |
| 2020/0100080 | A1* | 3/2020 | Mladin | H04W 4/50 |

FOREIGN PATENT DOCUMENTS

| | | |
|---|---|---|
| CN | 104717118 A | 6/2015 |
| CN | 105163285 A | 12/2015 |
| CN | 105991712 A | 10/2016 |
| CN | 106231607 A | 12/2016 |
| CN | 106358245 A | 1/2017 |
| CN | 106455096 A | 2/2017 |
| EP | 3119156 A1 | 1/2017 |
| WO | 2007112784 A1 | 10/2007 |

OTHER PUBLICATIONS

CN First Office Action in Application No. 201780000548.8, dated Nov. 3, 2020.

* cited by examiner

METHOD FOR IMPLEMENTING EDGE COMPUTING OF NETWORK AND DEVICE THEREOF

CROSS-REFERENCE TO RELATED APPLICATION

This application is a continuation of International Application No. PCT/CN2017/091053 filed on Jun. 30, 2017, the disclosure of which is hereby incorporated by reference in its entirety.

BACKGROUND

Edge computing generally refers to an open platform that integrates network, computing, storage, and application core capabilities at the edge of the network signal reception coverage, near the source or data source, provides edge intelligent services to meet the key requirements of industry digitalization in agile connections, real-time services, data optimization, and application intelligence, security and privacy protection.

SUMMARY

The present disclosure generally relates to the field of communication technologies, and more specifically to a method for implementing edge computing of a network and a device thereof.

In some embodiments of the present disclosure, there is provided a method for implementing edge computing of a network, which is performed by a base station. The method is comprising the steps of transmitting a notification signaling to a terminal after obtaining a target result, wherein the notification signaling is used to notify the terminal of the target result and the target result is used to indicate network edge computing capabilities, provided by the base station, including a capability of serving current service of the terminal; receiving a first obtaining request transmitted, in response to the notification signaling, by the terminal, wherein the first obtaining request is used to obtain service data corresponding to the current service; and transmitting the service data to the terminal in response to the first obtaining request.

In some embodiments, the step of obtaining a target result comprises analyzing data packets transmitted, by the terminal, to the base station to obtain a current service identification of the current service corresponding to the current service of the terminal; and checking whether service identification candidates including the current service identification of the current service, wherein the target result is obtained when the service identification candidates includes the current service identification of the current service and the service identification candidates include identifications of services provided by the network edge computing capability.

In some embodiments, after the step of transmitting a notification signaling to a terminal after obtaining a target result, the method further comprises: receiving a request for switching data path, wherein the request for switching data path is used to request to switch the data path, for obtaining the service data, of the terminal to the base station; and transmitting a third confirmation message to the terminal when the data path of obtaining, by the terminal, the service data is confirmed to switch to the base station, wherein after the data path of the service data is allowed to be switched to the base station, a third confirmation message, for switching data path, is transmitted to the terminal and the first obtaining request is then transmitted to the base station in response to the notification signaling, after the third confirmation message for switching data path is received by the terminal.

In some embodiments of the present disclosure, there is provided a method for implementing edge computing of a network, which is performed by a terminal. The method is comprising the steps of receiving a notification signaling transmitted by a base station, wherein the notification signaling is used to notify the terminal of the target result and the target result is used to indicate network edge computing capabilities, provided by the base station, including a capability of serving current service of the terminal; transmitting a first obtaining request to the base station in response to the notification signaling, wherein the first obtaining request is used to request obtaining the service data corresponding to the current service; and receiving the service data transmitted, by the base station, in response to the first obtaining request.

In some embodiments, after the step of transmitting a notification signaling by the base station, the method further comprises outputting a prompt message to a user to confirm whether to obtain the service data via the base station, wherein after a first confirmation message, a confirmation of performing the step of obtaining the service data via the base station, of the user is received, the notification signaling is executed to perform the step of transmitting a first obtaining request.

In some embodiments, after the step of receiving the first confirmation message, a confirmation of performing the step of obtaining the service data via the base station, of the user, the method further comprises transmitting a request for switching data path to a core network when the current service is currently in progress, wherein the request for switching data path is used to request to switch the data path, for obtaining the service data, of the terminal to the base station, wherein after a second confirmation message, a confirmation of performing the step of switching data path, is returned by the core network, the step of transmitting a first obtaining to a base station is performed in response to the notification signaling.

In some embodiments, after the step of receiving the first confirmation message, a confirmation of performing the step of obtaining the service data via the base station, of the user, the method further comprises transmitting a request for switching data path to the base station when the current service includes the current requesting service, wherein the request for switching data path is used to request to switch the data path, for obtaining the service data, of the terminal to the base station, wherein after a third confirmation message, a confirmation of performing the step of switching data path, is returned by the core network, the step of transmitting a first obtaining to a base station is performed in response to the notification signaling.

In some embodiments of the present disclosure, there is provided a method for implementing edge computing of a network, which is performed by a base station. The method is comprising the steps of transmitting edge computing capabilities, supported by the base station, of a network to a terminal, wherein the terminal determines whether the edge computing capabilities includes capabilities for providing services of current services of the terminal to generate a determination result; receiving a second obtaining request transmitted by the terminal, wherein the second obtaining request is transmitted after the determination result is confirmed, by the terminal, as a target result and the target result is used to indicate the edge computing capabilities, supported by the base station, including the capabilities for providing services of current services of the terminal, wherein the second obtaining request is used to request service data corresponding to the current service and transmitting the service data to the terminal in response to the second obtaining request.

In some embodiments, after the step of transmitting edge computing capabilities, supported by the base station, of a network to a terminal, the method further comprises receiving the request, transmitted by the terminal, for switching the data path, wherein the request for switching data path is used to request to switch the data path, for obtaining the service data, of the terminal to the base station, wherein after the data path of the service data is allowed to be switched to the base station, a third confirmation message, for switching data path, is transmitted to the terminal and the second obtaining request is then transmitted to the base station, after the third confirmation message for switching data path is received by the terminal.

According to another aspect of embodiments of the present disclosure, there is provided a method for implementing edge computing of a network, which is performed by a terminal. The method is comprising the steps of receiving edge computing capabilities, transmitted by a base station, of a network, wherein the edge computing capabilities are supported by the base station; determining whether the edge computing capabilities include capabilities for providing services of current services of the terminal to generate a determination result; transmitting a second obtaining request after the determination result being confirmed as a target result, wherein the target result is used to indicate the edge computing capabilities, supported by the base station, including the capabilities for providing services of current services of the terminal, wherein the second obtaining request is used to request service data corresponding to the current service; and receiving the service data transmitted, by the base station, in response to the second obtaining request.

In some embodiments, the step of determining whether the edge computing capabilities includes capabilities for providing services of current services of the terminal to generate a determination result comprises checking whether service identification candidates include a current service identification corresponding to the current service, wherein the alternative service identifications include service identifications of all services provided by the edge computing capabilities of the network, wherein the determination result is confirmed as the target result when the alternative service identifications includes the current service identification.

In some embodiments, after the determination result is confirmed as the target result, the method further comprises outputting a prompt message for requesting a user to confirm whether the service data is obtained via the base station, wherein the step of transmitting the second obtaining request to the base station is performed after the first confirmation message, a confirmation of performing the step of obtaining the service data via the base station, of the user is received.

In some embodiments, after the first confirmation message, a confirmation of performing the step of obtaining the service data via the base station, of the user is received, the method further comprises transmitting a request for switching data path to the core network when the current service is currently in progress, wherein the request for switching data path is used to request to switch the data path, for obtaining the service data, of the terminal to the base station, wherein the step of transmitting the second obtaining request to the base station is performed after the second confirmation message, a confirmation of performing the step of switching data path, is returned by the core network.

In some embodiments, after the first confirmation message, a confirmation of performing the step of obtaining the service data via the base station, of the user is received, the method further comprises transmitting a request for switching data path to the base station, wherein the request for switching data path is used to request to switch the data path, for obtaining the service data, of the terminal to the base station, wherein the step of transmitting the second obtaining request to the base station is performed after the third confirmation message, a confirmation of performing the step of switching data path, is returned by the core network.

According to another aspect of embodiments of the present disclosure, there is provided a device for implementing edge computing of a network, which is equipped with a base station. The device comprises a first transmitting module configured to transmit a notification signaling to a terminal after a target result is obtained, wherein the notification signaling is used to notify the terminal of the target result and the target result is used to indicate a network edge computing capability, provided by the base station, including a capability of serving current service of the terminal; a first receiving module configured to receive a first obtaining request transmitted, by the terminal, in response to the notification signaling, wherein the first obtaining request is used to obtain service data corresponding to the current service; and a second transmitting module configured to transmit the service data to the terminal in response to the first obtaining request.

In some embodiments, the first transmitting module comprises an obtaining sub-module configured to analyze data packets transmitted, by the terminal, to the base station to obtain a current service identification of the current service corresponding to the current service of the terminal; a first checking sub-module configured to check whether service identification candidates including the current service identification of the current service, wherein the target result is obtained when the service identification candidates includes the current service identification of the current service and the service identification candidates includes identifications of services provided by the network edge computing capability.

In some embodiments, the device further comprises a second receiving module configured to receive a request for switching data path, wherein the request for switching data path is used to request to switch the data path, for obtaining the service data, of the terminal to the base station; a third transmitting module configured to transmit a third confirmation message to the terminal when the data path of obtaining, by the terminal, the service data is confirmed to switch to the base station, wherein after the data path of the service data is allowed to be switched to the base station, a third confirmation message, for switching data path, is transmitted to the terminal and the first obtaining request is then transmitted, by the third transmitting module, to the base station in response to the notification signaling, after the third confirmation message for switching data path is received by the terminal.

According to another aspect of embodiments of the present disclosure, there is provided a device for implementing edge computing of a network, which is equipped with a terminal. The device comprises a third receiving module configured to receive a notification signaling transmitted by a base station, wherein the notification signaling is used to notify the terminal of the target result and the target result is used to indicate a network edge computing capability, provided by the base station, including a capability of serving current service of the terminal; a fourth transmitting module configured to transmit a first obtaining request to the base station in response to the notification signaling, wherein the first obtaining request is used to request to obtain service data corresponding to the current service; and a fourth receiving module configured to receive the service data transmitted, by the base station, in response to the first obtaining request.

In some embodiments, the device further comprises a first output module configured to output a prompt message to a user to confirm whether to obtain the service data via the base station; a first control module configured to control the fourth transmitting module to transmit, in response to the notification signaling, a first obtaining request to the base station after a first confirmation message, a confirmation of obtaining the service data via the base station, of the user is received by the first control module.

In some embodiments, the device further comprises a fifth transmitting module configures to transmit a request for switching data path to a core network when the current service is currently in progress, wherein the request for switching data path is used to request to switch the data path, for obtaining the service data, of the terminal to the base station; a second control module configured to control the fourth transmitting module to transmit a first obtaining request to the base station after a second confirmation message, a confirmation of performing the step of switching data path, is returned by the core network.

In some embodiments, the device further comprises a sixth transmitting module configured to transmit a request for switching data path to the base station when the current service including current requesting service, wherein the request for switching data path is used to request to switch the data path, for obtaining the service data, of the terminal to the base station; a third control module configured to transmit a first obtaining request to the base station after a third confirmation message, for switching data path, returned by the core network is received by the third control module.

According to another aspect of embodiments of the present disclosure, there is provided a device for implementing edge computing of a network, wherein the device is equipped with a base station, the device comprises a seventh transmitting module configured to transmit edge computing capabilities, supported by the base station, of a network to a terminal, wherein the terminal determines whether the edge computing capabilities includes capabilities for providing services of current services of the terminal to generate a determination result; a fifth receiving module configured to receive a second obtaining request transmitted by the terminal, wherein the second obtaining request is transmitted after the determination result is confirmed, by the terminal, as a target result and the target result is used to indicate the edge computing capabilities, supported by the base station, including the capabilities for providing services of current services of the terminal, wherein the second obtaining request is used to request service data corresponding to the current service; a eighth transmitting module configured to transmit the service data to the terminal in response to the second obtaining request.

In some embodiments, the device further comprises a sixth receiving module configured to receive a request, transmitted by the terminal, for switching data path, wherein the request for switching data path is used to request to switch data path, for obtaining the service data, of the terminal to the base station; a ninth transmitting module configured to transmit a third confirmation message to the terminal as the data path, for obtaining the service data, of the terminal being confirmed to be switched to the base station and the terminal transmitting a second obtaining request to the base station after the terminal confirmed the determined result as a target result and received the third confirmation message.

According to another aspect of embodiments of the present disclosure, there is provided a device for implementing edge computing for a network, wherein the device is equipped with a terminal, the device comprises a seventh receiving module configured to receive network edge computing capabilities supported by a base station; a determination module configured to determine whether the network edge computing capabilities including capabilities of serving current services of the terminal and generate a determination result; a tenth transmitting module configured to transmit a second obtaining request to the base station, wherein the target result is used to indicate a network edge computing capability, provided by the base station, including a capability of serving current service of the terminal; an eighth receiving module configured to receive the service data transmitted by the base station and the service data is transmitted in response to the second obtaining request.

In some embodiments, the determination module comprises a second checking sub-module configured to check whether service identification candidates including the current service identification of the current service, wherein the target result is obtained when the service identification candidates includes the current service identification of the current service and the service identification candidates include identifications of services provided by the network edge computing capability; a confirmation sub-module configured to confirm the determination result as the target result when the service identification candidates include the current service identification of the current service.

In some embodiments, the device further comprises a second output module configured to output a prompt message to request a user to confirm whether the service data is obtained via the base station; a fourth control module configured to control the tenth transmitting module to transmit a second obtaining request to the base station in response to the received first confirmation message, a confirmation for obtaining the service data via the base station, of the user, wherein the received first confirmation message is generated in response to the prompt message.

In some embodiments, the device further comprises an eleventh transmitting module configured to transmit a request for switching data path to a core network when the current service is currently in progress, wherein the request is used to request to switch data path, for obtaining the service data, of the terminal to the base station; a fifth control module configured to control the tenth transmitting module to transmit a second obtaining request to the base station after a second confirmation message, a confirmation for switching data path, returned by the core network is received by the fifth control module.

In some embodiments, the device further comprises a twelfth transmitting module configured to transmit a request for switching data path to the base station when the current service comprising the current request service, wherein the request is used to request to switch data path, for obtaining the service data, of the terminal to the base station; a sixth control module configured to control the tenth transmitting module to transmit a second obtaining request to the base station after a third confirmation message, a confirmation for switching data path, returned by the base station is received by the sixth control module.

According to another aspect of embodiments of the present disclosure, there is provided a non-transitory computer-readable storage medium having stored therein instructions which are executed to perform a method for implementing edge computing of a network of the first aspect.

According to another aspect of embodiments of the present disclosure, there is provided a non-transitory computer-readable storage medium having stored therein instructions which are executed to perform a method for implementing edge computing of a network described above.

According to another aspect of embodiments of the present disclosure, there is provided a non-transitory computer-readable storage medium having stored therein instructions which are executed to perform a method for implementing edge computing of a network described above.

According to another aspect of embodiments of the present disclosure, there is provided a non-transitory computer-readable storage medium having stored therein instructions which are executed to perform a method for implementing edge computing of a network described above.

According to another aspect of embodiments of the present disclosure, there is provided a device for implementing edge computing for a network, wherein the device is equipped with a base station, the device comprises a processor; a memory having stored instructions executed by the processor, wherein the processor is configured to transmit a notification signaling to a terminal after obtaining a target result, wherein the notification signaling is used to notify the terminal of the target result and the target result is used to indicate network edge computing capabilities, provided by the base station, including a capability of serving current service of the terminal; receiving a first obtaining request transmitted, in response to the notification signaling, by the terminal; transmitting the service data, in response to the first obtaining request, to the terminal.

In some embodiments of the present disclosure, there is provided a device for implementing edge computing for a network, wherein the device is equipped with a terminal, the device comprises a processor; a memory having stored instructions executed by the processor, wherein the processor is configured to receive a notification signaling transmitted by a base station and the notification signaling is used to notify the terminal of the target result and the target result is used to indicate network edge computing capabilities, provided by the base station, including a capability of serving current service of the terminal; transmitting, in response to the notification signaling, a first obtaining request to the base station, wherein the first obtaining request is used to request to obtain service data corresponding to the current service; receiving the service data transmitted, in response to the first obtaining request, by the base station.

According to another aspect of embodiments of the present disclosure, there is provided a device for implementing edge computing for a network, wherein the device is equipped with a base station, the device comprises a processor; a memory having stored instructions executed by the processor, wherein the processor is configured to transmit edge computing capabilities of a network to a terminal which allow the terminal to obtain a determination result by determining whether the edge computing capabilities of a network include a capability of serving the current services; receiving a second obtaining request transmitted by the terminal after the determination result being confirmed as a target result, wherein the target result is used to indicate a network edge computing capability, provided by the base station, including a capability of serving current service of the terminal and the second obtaining request is used to request to obtain service data corresponding to the current service; transmitting, in response to the second obtaining request, the service data to the terminal.

According to another aspect of embodiments of the present disclosure, there is provided a device for implementing edge computing for a network, wherein the device is equipped with a terminal, the device comprises a processor; a memory having stored instructions executed by the processor, wherein the processor is configured to receive edge computing capabilities for a network, supported and transmitted by a base station; determining whether the edge computing capabilities of a network include a capability of serving the current services for the terminal to obtain a determination result; transmitting a second obtaining request to the base station after the determination result being confirmed as a target result, wherein the target result is used to indicate that the edge computing capabilities for a network, supported by the base station, include a capability of serving the current service and the second obtaining request is used to request to obtain service data corresponding to the current service; receiving the service data transmitted, in response to the second obtaining request, by the base station.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terminology used in this disclosure is only for the purpose of describing particular embodiments and is not intended to limit the disclosure. As used in this disclosure and the appended claims, the singular forms "a," "said," and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in this disclosure to describe various information, such information should not be limited to therein. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "at" or "when" or "in response to determination".

The standardization of 5G (New Radio, NR) system is being proceeded in 3rd Generation Partnership Project (3GPP). However, there is no proposal for implementing network edge computing so far.

In the embodiments of the present disclosure, there is provided two methods for implementing edge computing for a network. One method allows a base station to determine whether edge computing capabilities, supported by the base station, include a capability of serving the current service of a terminal. Another method allows the terminal to determine whether edge computing capabilities, supported by the base station, include a capability of serving the current service of the terminal. In either one of the methods, the target of pertinently and precisely providing edge computing capability of the base station to the terminal is achieved.

The following illustrates a first aspect of a method for implementing edge computing for a network.

Figure 1:
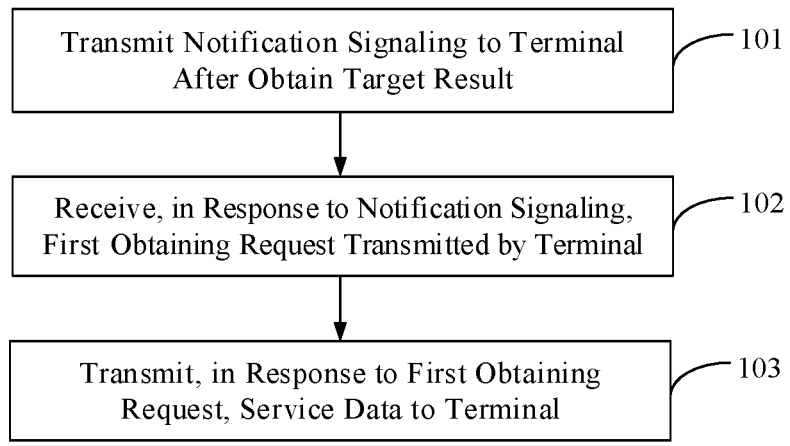
FIG. 1 is a flowchart showing a method for implementing edge computing of a network, according to some embodiments.

In this embodiment of the present disclosure, there is provided a method for implementing edge computing of a network, wherein the method is performed by a base station. The base station includes a New Radio (NR) station or an enhancing Long-Term Evolution (eLTE) base station. FIG. 1. is a flowchart showing a method for implementing edge computing of a network, according to some embodiments. As shown in FIG. 1, the method can include the following steps.

In step 101, after a target result is obtained, a notification signaling is transmitted to a terminal. The notification signaling is used to notify the terminal of the target result and the target result is used to indicate network edge computing capabilities, provided by the base station, including a capability of serving current service of the terminal.

In step 102, a first obtaining request transmitted, in response to the notification signaling, by the terminal is received, wherein the first obtaining request is used to obtain service data corresponding to the current service.

In step 103, the service data is transmitted, in response to the first obtaining request, to the terminal.

In this embodiment of the present disclosure, after the target result is received by the base station, the notification signaling is transmitted to the terminal, wherein the notification signaling is used to notify the terminal of the target result and the target result is used to indicate network edge computing capabilities, provided by the base station, including a capability of serving current service of the terminal. A first obtaining request is transmitted, in response to the notification signaling, by the terminal to request to obtain service data corresponding to current service of the terminal. Therefore, the base station transmits, in response to the first obtaining request, the service data to the terminal. Therefore, the terminal, for processing the service data of edge computing of the network, is then accurately determined by the base station. The target of implementing edge computing of the network and improvement of the pertinence and precision of edge computing of the network is achieved.

Figure 2:
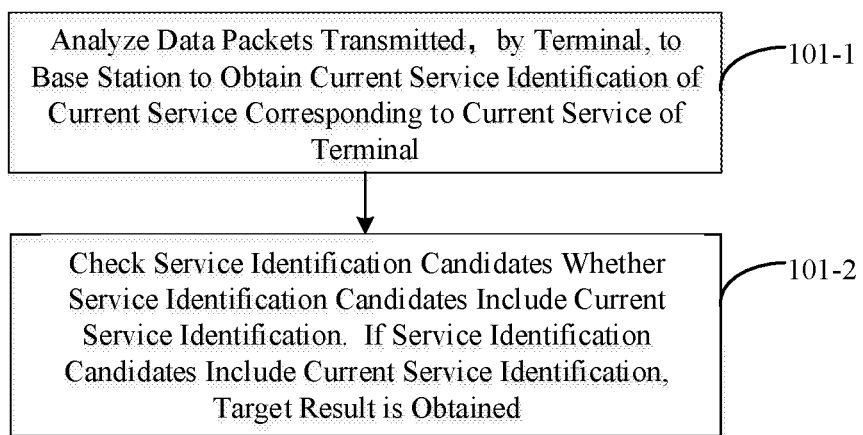
FIG. 2 is a flowchart showing another method for implementing edge computing of a network, according to some embodiments.

FIG. 2 illustrates another method for implementing edge computing of a network of the embodiment of FIG. 1. As shown, step 101 can include step 101-1. In step 101-1, data packets transmitted, by the terminal, to the base station are analyzed to obtain a current service identification of the current service corresponding to the current service of the terminal. In this step, the data packets transmitted, by the terminal, to the base station are analyzed by the base station, wherein the data packet carries the current service identification corresponding to the current service of the terminal. The base station is capable of analyzing the data packets according to the related technology for obtaining the current service identification.

In step 101-2, service identification candidates are checked whether the service identification candidates include the current service identification. If the service identification candidates include the current service identification, the target result is obtained. In this step, service identifications of all service provided by edge computing capabilities, supported by the base station, of a network are considered as the service identification candidates. Furthermore, the service identification candidates are checked whether the service identification candidates include the current service identification.

If the service identification candidates include the current service identification, for example, the service identification candidates include a service identification 1, a service identification 2 and a service identification 3. When the current service identification is the service identification 2, a target result is obtained by the base station. The target result indicates a network edge computing capability, provided by the base station, including a capability of serving current service of the terminal.

After the target result is obtained by the base station, a unicast is further sent with the notification signaling of the terminal according to the related technology. After the notification signaling is received by the terminal, a first obtaining request is transmitted, in response to the notification signaling, to the base station to request to obtain the service data corresponding to the current service.

When the service identification candidates do not include the current service identification, which means the base station is not able to serve the current services of the terminal, the terminal is able to obtain service data from the corresponding server according to the related technology.

In step 102, a first obtaining request is transmitted, by the terminal, to the base station and the first obtaining request is then received by the base station according to the related technology, wherein the first obtaining request is used to request to obtain service data corresponding to the current service of the current terminal.

In step 103, after the first obtaining request is received by the base station, service data, pre-cached by the base station, corresponding to the current service is transmitted to the terminal.

For example, when the current service is a video stream service, video stream data corresponding to the current service and video stream, pre-cached by the base station, are transmitted to the terminal for providing video stream service to the terminal.

When the current service is a web browsing service and the contents of the web is remained for a while, the web data, pre-cached by the base station, is directly transmitted to the target terminal to provide web browsing service to the terminal.

In the related technologies, the service server with high authority, a network node, is located within a geometric region which is far away to a location where the terminal is located. In this embodiment of the present disclosure, when a base station is capable of serving current services of a terminal, the terminal is not necessary to obtain service data from a service server.

For example, a video stream service is requested, via a target terminal, by a user in a county of Hebei province. When the edge computing capabilities supported by a base station, connected to the target terminal, include a capability of providing video stream service, the target terminal is able to directly obtain the video stream data, corresponding to the video stream service, from the base station. The target terminal is not necessary to access a video stream server located at Shijiazhung, the capital of Heibei province, to obtain corresponding video stream data, which accelerate the speed of obtaining video stream data.

Since the target terminal is not necessary to access a video stream server to obtain corresponding video stream data, the base station is capable of transmitting service data to the terminal and the target of providing pertinence and precision services of edge computing of the network is achieved. The services are provided by the base station.

Figure 3:
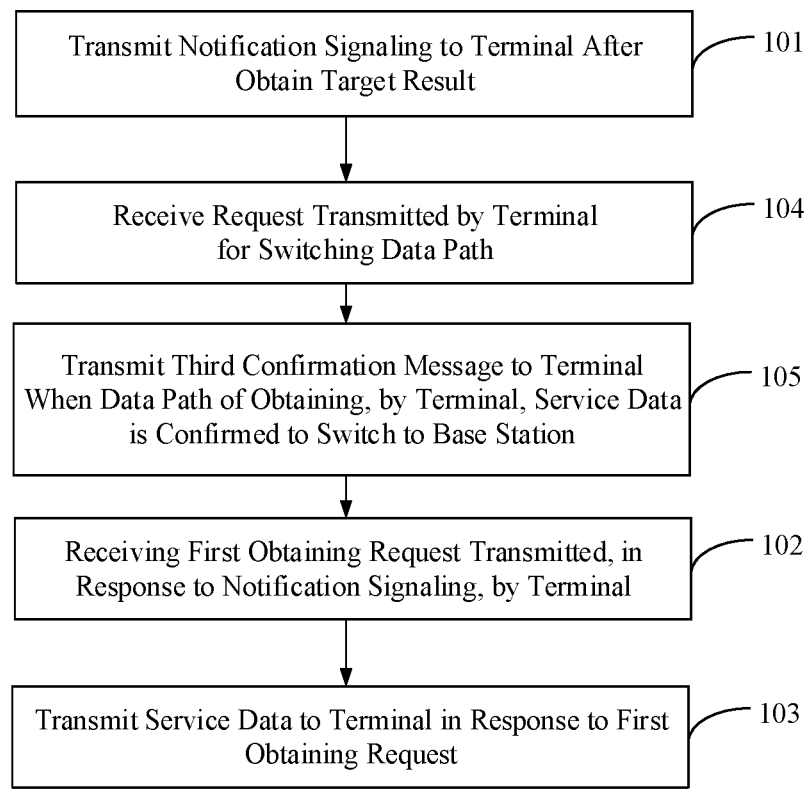
FIG. 3 is a flowchart showing another method for implementing edge computing of a network, according to some embodiments.

FIG. 3 is a flowchart showing another method for implementing edge computing of a network of the embodiment of FIG. 2. As shown, after the step 101 is performed, the method of implementing edge computing further includes step 104. In step 104, a request for switching data path, transmitted by the terminal, is received, wherein the request for switching data path is used to request to switch the data path, for obtaining the service data, of the terminal to the base station.

In this embodiment, after a target result is received by the base station, a notification signaling is transmitted to a terminal. After the notification signaling is received by the terminal, a request for switching data path is then transmitted to the base station. The request for switching data path is used to request to switch the data path, for obtaining the service data, of the terminal to the base station.

In step 105, when the data path of obtaining the service data, by the terminal, is confirmed to switch to the base station, a third confirmation message is transmitted to the terminal. After the third confirmation message is received by the terminal, a first is then transmitted, in response to the notification signaling, to the base station.

In this embodiment, when the data path of obtaining the service data is confirmed to switch from the terminal to the base station, the third confirmation message is then transmitted to the terminal. After the third confirmation message is received by the terminal and the switching of data path is confirmed by the base station, a first obtaining request is then transmitted, in response to the notification signaling, to the base station. Therefore, the base station provides service data to the terminal.

Figure 4:
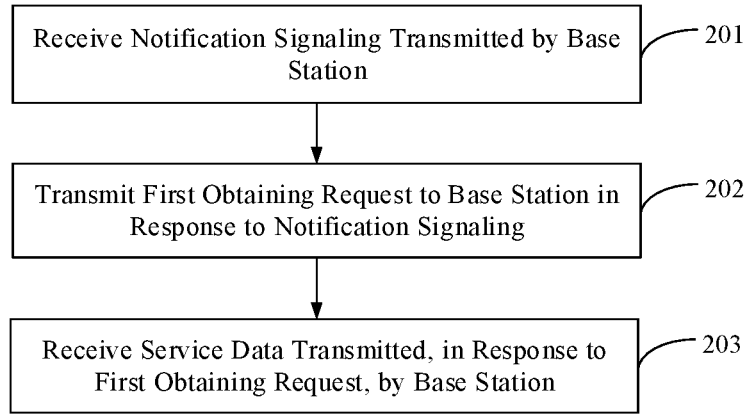
FIG. 4 is a flowchart showing another method for implementing edge computing of a network, according to some embodiments.

In this embodiment, after the request for switching data path, transmitted by the terminal, is received by the base station and the data path of obtaining the service data is confirmed to switch from the terminal to the base station, the third confirmation message is transmitted to the terminal. After the third confirmation message is received by the terminal, and the switching of data path is confirmed by the base station, a first obtaining request is then transmitted, in response to the notification signaling, to the base station. Therefore, after the switching of data path is confirmed by the base station, service data is then requested to obtain by the terminal and the performance of 5G systems is then improved with high availability. In this embodiment of the present disclosure, there is provided a method for implementing edge computing of a network, wherein, the method is performed by a terminal. FIG. 4 is a flowchart showing another method for implementing edge computing of a network, according to some embodiments. The method illustrated in FIG. 4 can include the following steps.

In step 201, a notification signaling transmitted by a base station is received. The notification signaling is used to notify the terminal of the target result and the target result is used to indicate network edge computing capabilities, provided by the base station, including a capability of serving current service of the terminal.

In step S202, a first obtaining request is transmitted, in response to the notification signaling, to the base station. The first obtaining request is used to request obtaining the service data corresponding to the current service.

In step S203, the service data, transmitted, by the base station, in response to the first obtaining request is received.

In this embodiment, after the notification signaling transmitted by a base station is received by the terminal, a first obtaining request is transmitted, in response to the notification signaling, to the base station. The first obtaining request is used to request obtaining the service data corresponding to the current service. The service data is then transmitted, by the base station, in response to the first obtaining request to the terminal. Therefore, the service data is obtained from the base station based upon the notification signaling transmitted by the base station. The targets of providing, by the base station, edge computing service to the terminal and improvement of the pertinence and precision of edge computing of the network is achieved are achieved.

In step S201, after the target result is obtained by the base station and the edge computing capabilities, supported by the base station, include a capability of serving the current service of the terminal, a unicast with the notification signaling is further sent to the terminal. The unicast with the notification signaling is directly received by the terminal.

In step S202, after the notification signaling is received by the terminal, the terminal is then aware of that edge computing capabilities, supported by the base station, include a capability of serving the current service of the terminal. In the meantime, a first obtaining request is transmitted, by the terminal, to the base station in response to the notification signaling. The first obtaining request is used to request obtaining the service data corresponding to the current service.

In step 203, the service data, transmitted, by the base station, in response to the first obtaining request is received by the terminal.

In this embodiment of the present disclosure, after the service data is received by the terminal, the service data is then transmitted.

For example, after a video stream data of the current service, transmitted by the base station, is received by the terminal, the video stream data is then played via a video stream playing application. After web data of the current service, transmitted by the base station, is received by the terminal, the web data is then presented via a browser.

Figure 5:
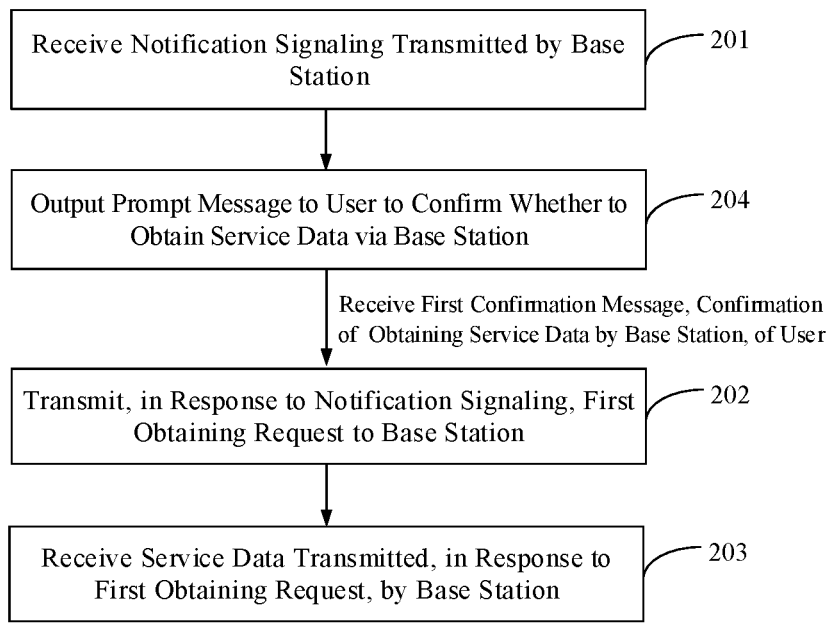
FIG. 5 is a flowchart showing another method for implementing edge computing of a network, according to some embodiments.

FIG. 5 is a flowchart showing another method for implementing edge computing of a network of the embodiment of FIG. 4. As shown, after step s201 is performed, the method for implementing edge computing of a network further includes the following steps.

In step 204, a prompt message is outputted to a user to confirm whether the service data is obtained by the base station.

Figure 6:
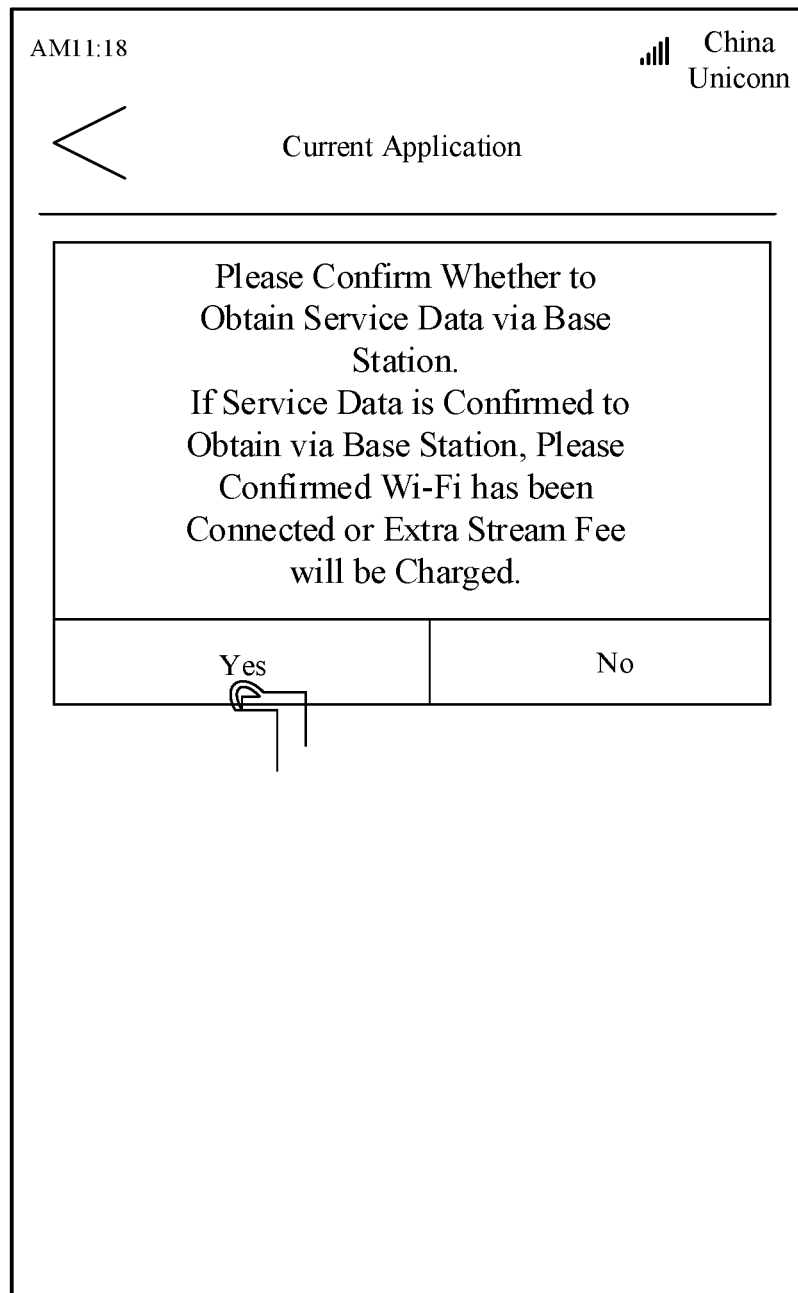
FIG. 6 is a scene diagram showing another method for implementing edge computing of a network, according to some embodiments.

In this embodiment of the present disclosure, since the service data is obtained via the base station, the service fee is generated due to data stream consumption made by the terminal. Therefore, a prompt message is displayed at the terminal after the notification signaling is received by the terminal. For example, as shown in FIG. 6, a prompt message is displayed to notify the user to confirm whether service data is obtained via the base station, since the service fee is generated due to data stream consumption, made by the terminal, of obtaining service data via the base station.

Furthermore, the user is able to confirm obtaining service data via the base station by triggering a pre-set virtual bottom. When the user confirmed obtaining service data via the base station, a first confirmation message is received by the terminal and step 202 is performed by the terminal. A first obtaining request is transmitted, in response to the notification signaling, to the base station to request the base station to transmit the service data to the terminal.

In this embodiment, after the notification signaling, transmitted by the base station, is received by the terminal, which allows the user to confirm whether to obtain service data via the base station. After the user confirmed to obtain the service data via the base station, a first obtaining request, for requesting to obtain service data, is then transmitted, in response to the notification signaling, to the base station. Therefore, since the user is able to confirm whether to obtain service data through the base station, the intelligence level of the terminal and the user experience are improved.

Figure 7:
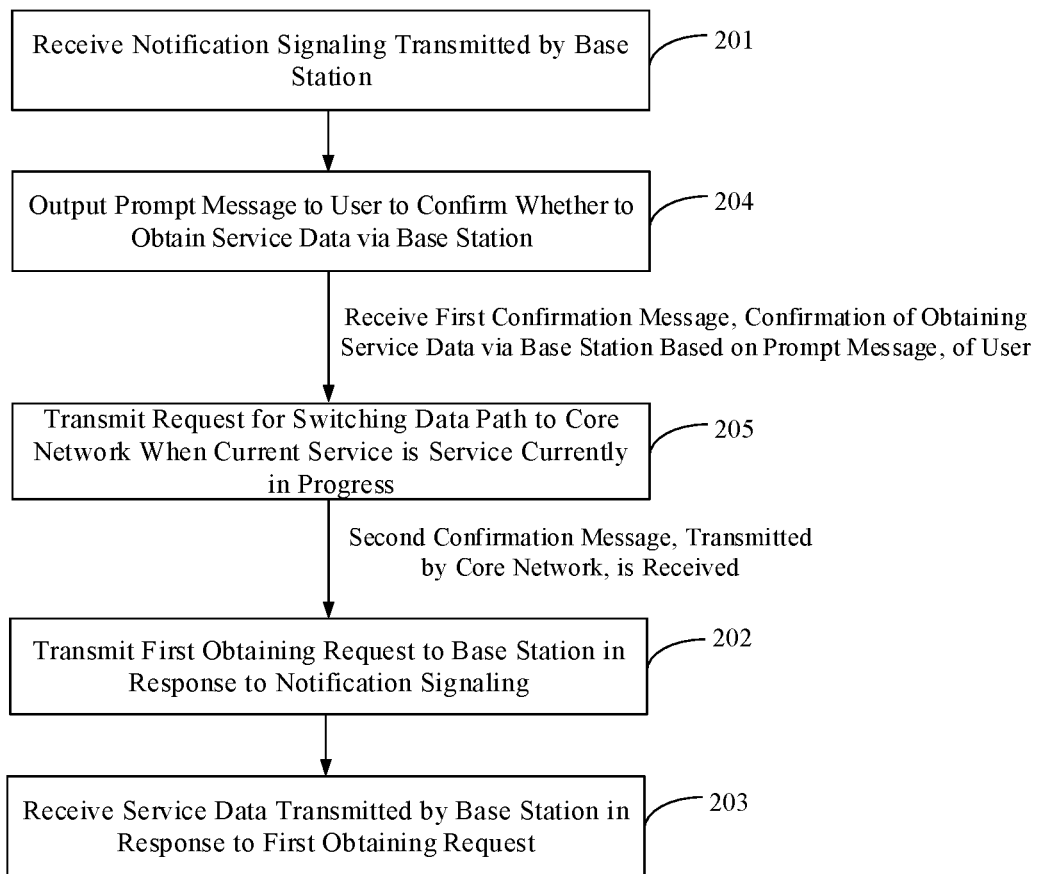
FIG. 7 is a flowchart showing another method for implementing edge computing of a network, according to some embodiments.

FIG. 7 illustrates another method for implementing edge computing of a network of the embodiment of FIG. 5. As shown, after a first confirmation message, a confirmation of obtaining the service data via the base station, of the user which is transmitted in response to the notification signaling is received, the method for implementing edge computing of a network further includes the followings.

In step 205, when the current service is a service currently in progress, a request for switching data path is transmitted to a core network. The request for switching data path is used to request to switch the data path, for obtaining the service data, of the terminal to the base station.

In this step, when a current service is in progress at the terminal, e.g. the current service being a service currently in progress, the service data transmitted by the server is received, via the core network, by the terminal.

In this embodiment of the present disclosure, after the notification signaling is received by the terminal and the user confirmed receiving service data via the base station, a request for switching data path is transmitted to the core network. The request for switching data path is used to request to switch the data path, for obtaining the service data, of the terminal to the base station.

After the data path is confirmed, by the core network, to be switched in response to the request for switching data path, a second confirmation message is transmitted, by the core network, to the terminal.

After the second confirmation message, transmitted by the core network, is received by the terminal, the step 202 is performed. A first obtaining request is transmitted, in response to the notification signaling, to the base station. In the meantime, the terminal in no longer receiving data packets transmitted by the core network or transmitting data packet to the core network. The terminal receives data packets carrying service data transmitted, by the base station, in response to the first obtaining request.

In this embodiment, when the current service is a service being currently in progress, a request for switching data path is transmitted, by the terminal, to the core network. After the second confirmation message, transmitted by the core network, is received by the terminal, the service data is then obtained via the base station. Therefore, the targets of providing, by the base station, edge computing service to the terminal and improvement of the pertinence and precision of edge computing of the network is achieved are achieved.

Figure 8:
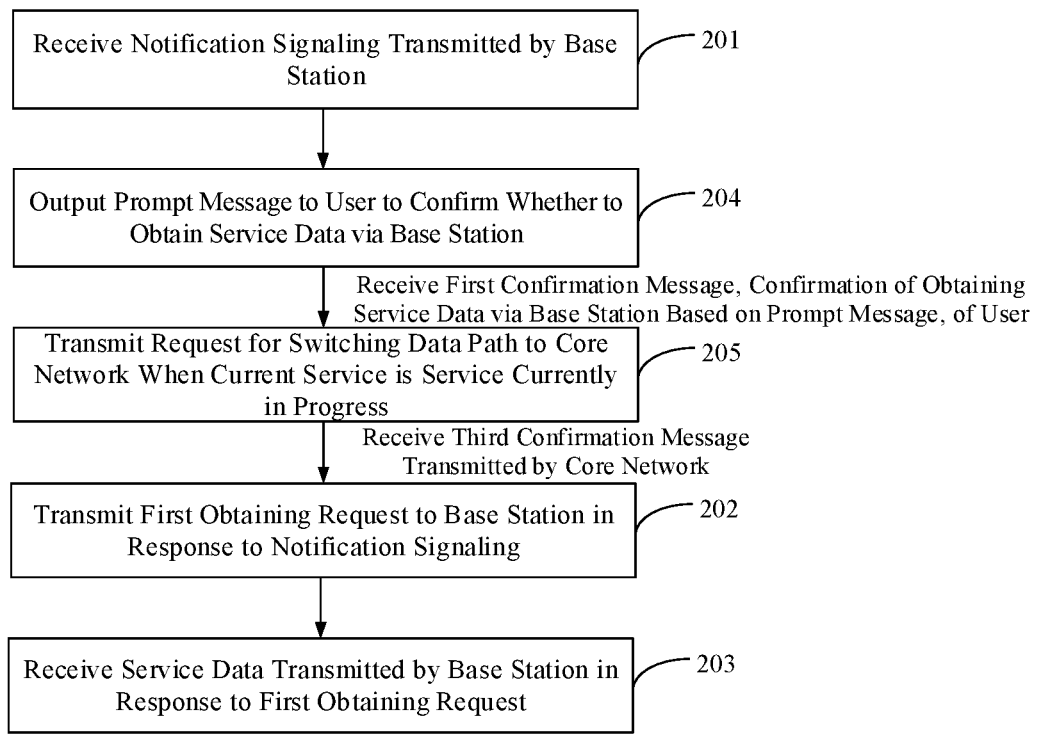
FIG. 8 is a flowchart showing another method for implementing edge computing of a network, according to some embodiments.

FIG. 8 illustrates another method for implementing edge computing of a network of the embodiment of FIG. 5. As shown, after a first confirmation message, a confirmation of obtaining the service data via the base station, of the user which is transmitted in response to the notification signaling is received, the method for implementing edge computing of a network further includes the followings.

In step 206, when the current service is a service currently in progress, a request for switching data path is transmitted to the base station. The request for switching data path is used to request to switch the data path, for obtaining the service data, of the terminal to the base station.

In this embodiment of the present disclosure, before the current service is served by the terminal, the terminal requests the current service from the base station, the current service is a service being currently requested. After the user confirmed to obtain service data via the base station, the terminal directly transmits a request for switching data path to the base station to request to switch the data path, for obtaining the service data, of the terminal to the base station.

When the base station confirmed switching data path, a third confirmation message is transmitted, by the base station, to the terminal. After the third confirmation message is received by the terminal, step 202 is performed. A first obtaining request is transmitted, by the terminal, to the base station in response to the notification signaling to obtain service data via the base station.

In this embodiment, when the current service is a service being currently requested, a request for switching data path is transmitted, by the terminal, to the base station. After the third confirmation message, transmitted by the base station, is received by the terminal, the service data is then obtained via the base station. The targets of providing, by the base station, edge computing service to the terminal and improvement of the pertinence and precision of edge computing of the network is achieved are achieved.

Figure 9:
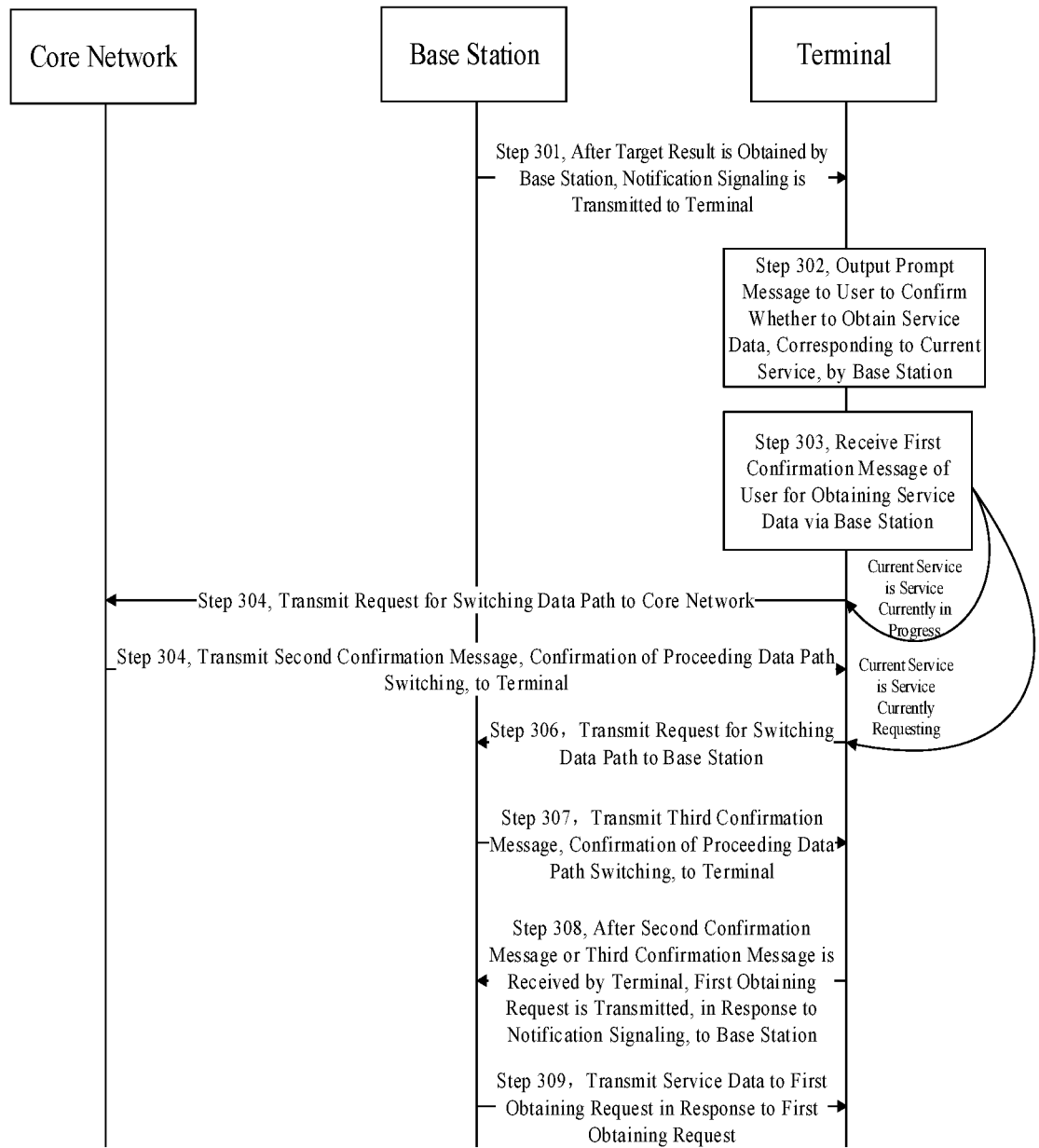
FIG. 9 is a flowchart showing another method for implementing edge computing of a network, according to some embodiments.

In the first aspect of the method for implementing edge computing of the network, as shown in FIG. 9, a method for implementing edge computing of a network according to some embodiments can include the following step.

In step 301, after the target result is obtained via the base station, a notification signaling is transmitted to the terminal, wherein the notification signaling is used to notify the terminal of the target result and the target result is used to indicate network edge computing capabilities, provided by the base station, including a capability of serving current service of the terminal.

In step 302, a prompt message is outputted to a user to confirm whether to obtain the service data, corresponding to the current service, by the base station.

In step 303, a first confirmation message of obtaining, in response to the prompt message, the service data via the base station of the user is received by the terminal.

When the current service is a service being currently in progress, the step 304 is performed. When the current service is a service being currently requested, the step 306 is performed.

In step 304, the request for switching data path is transmitted to the core network, wherein the request for switching data path is used to request to switch the data path, for obtaining the service data, of the terminal to the base station.

In step 305, a second confirmation message, a confirmation of performing switching data path, is transmitted, by the core network, to the terminal.

In step 306, a request for switching data path is transmitted, by the terminal, to the base station, wherein the request for switching data path is used to request to switch the data path, for obtaining the service data, of the terminal to the base station.

In step 307, a third confirmation message, a confirmation of performing switching data path, is transmitted, by the base station, to the terminal.

In step 308, after the second confirmation message or the third confirmation message is received by terminal, a first obtaining request is transmitted, in response to the notification signaling, to the base station.

In step 309, the service data is transmitted, by the base station, in response to the first obtaining request to the terminal.

In this embodiment, the base station is able to precisely transmit service data, based on the edge computing of the network, to the terminal according to the edge computing capabilities, supported by the base station. The target of implementing edge computing of the network is then achieved and the pertinence and precision of edge computing of the network are then improved.

The followings illustrate a second aspect of the method for implementing edge computing of a network.

Figure 10:
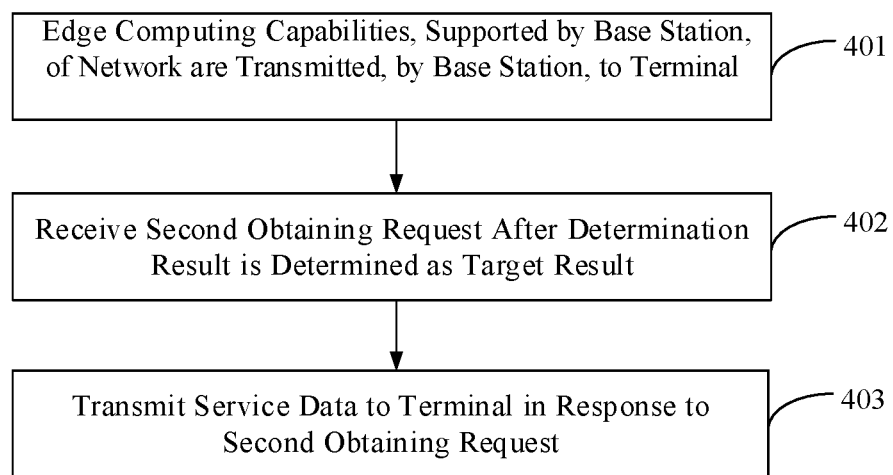
FIG. 10 is a flowchart showing another method for implementing edge computing of a network, according to some embodiments.

In this embodiment of the present disclosure, there is provided a method for implementing edge computing of a network. The method is performed by a base station and the base station includes a New Radio (NR) station or an enhancing Long-Term Evolution (eLTE) base station. FIG. 10 is a flowchart showing another method for implementing edge computing of a network, according to some embodiments. The method of FIG. 10 includes the following steps.

In step 401, the edge computing capabilities, supported by the base station, of a network are transmitted, by the base station, to a terminal. The terminal determines whether the edge computing capabilities includes capabilities for providing services of current services of the terminal to generate a determination result In step 402, after the determination result has been confirmed as a target result by the terminal, a second obtaining request, transmitted by the terminal, is received by the base station. The target result is used to indicate the edge computing capabilities, supported by the base station, including the capabilities for providing services of current services of the terminal. The second obtaining request is used to request service data corresponding to the current service.

In step 403, the service data is transmitted to the terminal in response to the second obtaining request.

In this embodiment, the base station is able to transmit edge computing capabilities of the network, supported by the base station, to the terminal. The terminal determines whether the edge computing capabilities of the network include capabilities for providing services of current services of the terminal to generate a determination result. After the determination result is determined, by the terminal, as a target result, a second obtaining request is transmitted to the base station.

Furthermore, after the second obtaining request is received by the base station, the service data is transmitted, in response to the second obtaining request, to the terminal. Therefore, the terminal is able to determine whether the edge computing capabilities of the network include capabilities for providing services of current services of the terminal. The target of implementing edge computing of the network is then achieved and the pertinence and precision of edge computing of the network are then improved.

In step 401, the base station is able to transmit the edge computing capabilities, supported by the base station, to the terminal in a manner of unicast signaling. In some embodiments, the base station is able to transmit service identifications of all services provided by the edge computing capabilities of the network in a manner of unicast signaling.

The service identifications, transmitted by the base station, is grouped, by the terminal, as service identification candidates. The service identification candidates are determined whether include the current service identifications corresponding to the current services. When the service identification candidates include the current service identification, the determination result is confirmed, by the terminal, as a target result. The target result indicates that the edge computing capabilities, supporter by the base station, of the network include the capability of serving the current service of the terminal.

In step 402, after the determination result is determined, by the terminal, as the target result, the second obtaining request is transmitted to the base station and the base station directly receives the second obtaining request with related technology. The second obtaining request is used to request to obtain service data corresponding to the current service.

In step 403, the pre-cached service data and the service data corresponding to the current service are transmitted, by the base station, to the terminal in response to the second obtaining request.

Figure 11:
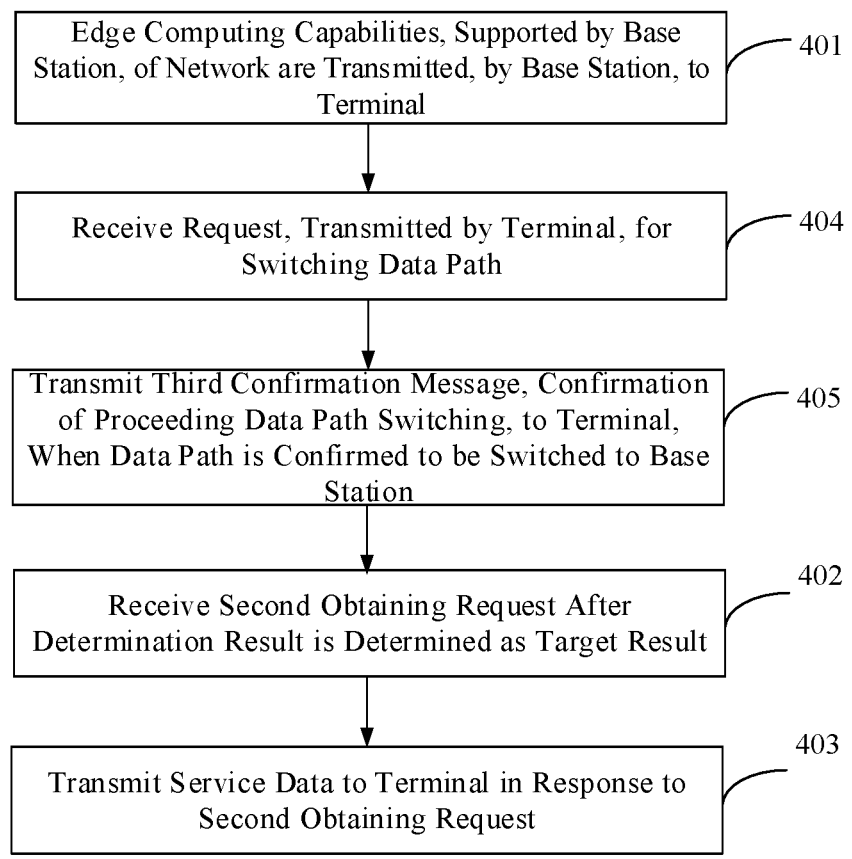
FIG. 11 is a flowchart showing another method for implementing edge computing of a network, according to some embodiments.

FIG. 11 illustrates another method for implementing edge computing of a network of the embodiment of FIG. 10. After step 401 is performed, the method for implementing edge computing of the network further included the following steps.

In step 404, a request for switching data path, transmitted by the terminal, is received. The request for switching data path is used to request to switch the data path, for obtaining the service data, of the terminal to the base station.

In this embodiment, the base station is able to transmit edge computing capabilities, supported by the base station, of the network to the terminal. After the determination result is determined, by the terminal, as the target result, the request for switching data path is transmitted to the base station and is directly received by the base station. When the current service of the terminal is the currently requested service, the request for switching data path is then transmitted to the base station. The request for switching data path is used to request to switch the data path of obtaining the service data of the terminal to the base station.

In step 405, when the data path of obtaining the service data of the terminal is confirmed to be switched to the base station, a third confirmation message, a confirmation of switching the data path, is transmitted to the terminal. After the determination result is confirmed as the target result and the third confirmation message is received, by the terminal, the second obtaining request is transmitted to the base station.

In this step, when the data path of obtaining the current service data is confirmed, by the base station, to be switched to the base station, the third confirmation message, a confirmation for switching the data path, is transmitted to the terminal. After the determination result is confirmed, by the terminal, as the target result and the third confirmation message is received by the terminal, the base station is able to serve the current service and the switching of the data path is confirmed by the base station, a second obtaining request is transmitted, by the terminal, to the base station. The service data is then provided, by the base station, to the terminal.

In this embodiment, after the request for switching the data path, transmitted by the terminal, is received by the base station and the data path of obtaining the service data is confirmed to be switched to the base station, a third confirmation message is transmitted to the terminal. After the determination result is confirmed, by the terminal, as the target result and the third confirmation message is received by the terminal, the second obtaining request is transmitted to the base station. Therefore, after the switching of data path is confirmed by the base station, the terminal then requests to obtain service data. The performance of 5G systems is then improved with high availability.

Figure 12:
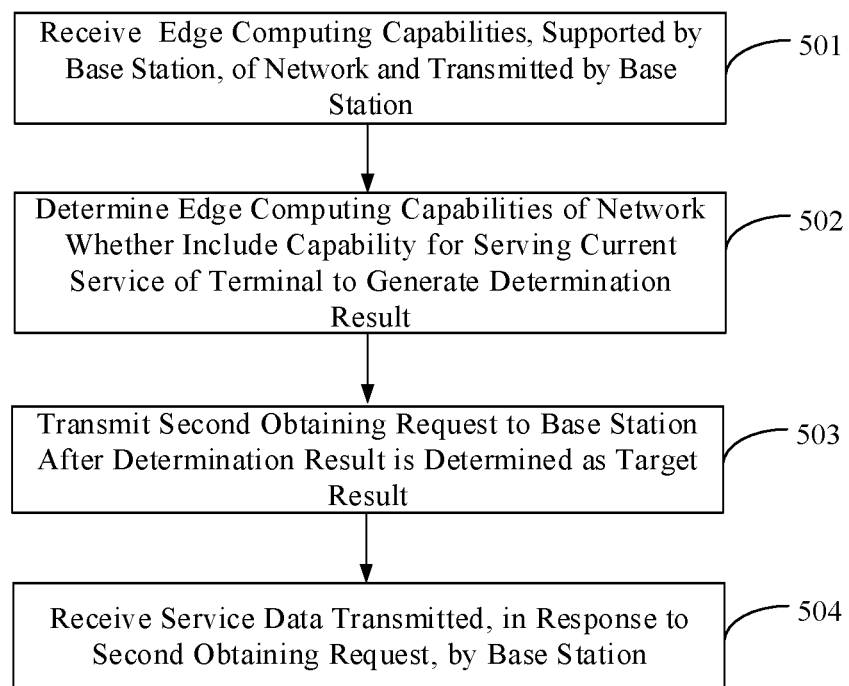
FIG. 12 is a flowchart showing another method for implementing edge computing of a network, according to some embodiments.

In some embodiments of the present disclosure, there is provided another method for implementing edge computing of a network, which is performed by a terminal. FIG. 12 is a flowchart showing another method for implementing edge computing of a network, according to some embodiments. The method of FIG. 12 includes the following steps.

In step 501, edge computing capabilities of a network, supported and transmitted by the base station, are received.

In step 502, the edge computing capabilities of the network are determined whether include a capability for serving the current service of the terminal to generate a determination result.

In step 503, after the determination result ids determined as a target result, a second obtaining request is transmitted to the base station. The target result is used to indicate network edge computing capabilities, provided by the base station, including a capability of serving current service of the terminal. The second obtaining request is used to request service data corresponding to the current service.

In step 504, the service data is transmitted, by the base station, in response to the second obtaining request.

In this embodiment, the edge computing capabilities, supported by the base station, of the network is transmitted, by the base station, to the terminal. The edge computing capabilities of the network are determined, by the terminal, whether include a capability of serving the current service to generate the determination result. After the determination result is determined as a target result, a second obtaining request is transmitted to the base station to request to obtain service data from the base station. Therefore, the base station is able to precisely transmit service data, based on the edge computing of the network, to the terminal according to the edge computing capabilities. The target of implementing edge computing of the network is then achieved and the pertinence and precision of edge computing of the network are then improved.

In step 501, the base station is able to transmit service identifications of all services provided by the edge computing capabilities of the network in a manner of unicast signaling to the terminal and the terminal directly receives the unicast.

In step 502, the service identifications, transmitted by the base station, is grouped, by the terminal, as service identification candidates. The service identification candidates are determined whether include the current service identifications corresponding to the current services. When the service identification candidates include the current service identification, the determination result is confirmed, by the terminal, as a target result. The edge computing capabilities of the network, supported by the base station, include the capability of serving the current service of the terminal.

When the service identification candidates do not include the current service identification, the terminal is able to obtain service data from the corresponding server according to the related technology.

In step 503, after the determination result is determined as the target result, a second obtaining request is transmitted to the base station and the second obtaining request is used to request service data corresponding to the current service.

In step 504, the service data is transmitted, by the base station, to the terminal in response to the second obtaining request and the terminal directly receives the service data.

Moreover, after the service data is received by the terminal, the service data is transmitted. The way of transmission is similar to the way of service data transmission of the first aspect of the method for implementing edge computing of the network, which will not be further described therein.

Figure 13:
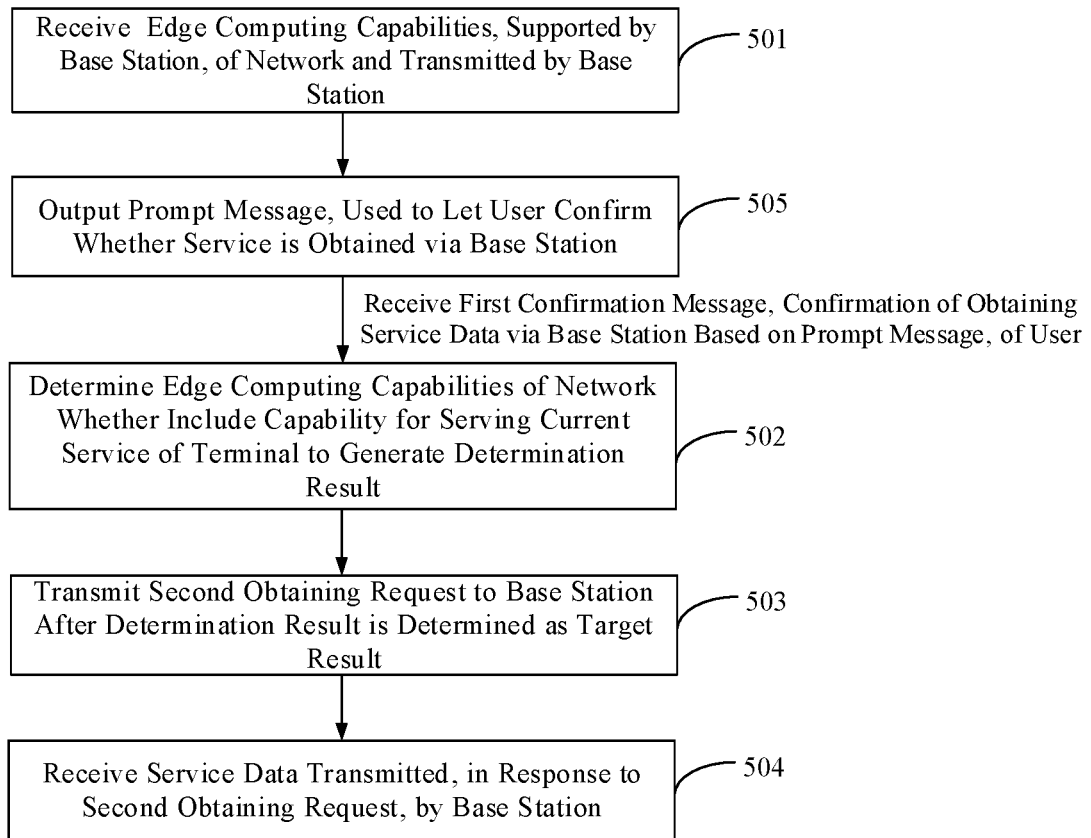
FIG. 13 is a flowchart showing another method for implementing edge computing of a network, according to some embodiments.

FIG. 13 illustrates another method for implementing edge computing of a network of the embodiment of FIG. 12. After the determination result is determined as the target result, the method for implementing edge computing of the network further include the followings.

In step 505, a prompt message is outputted and the prompt message is used to let the user confirm whether the service is obtained via the base station.

In this embodiment of the present disclosure, since the service data is obtained via the base station, the service fee is generated due to data stream consumption made by the terminal. Therefore, a prompt message is displayed at the terminal after the notification signaling is received by the terminal. For example, as shown in FIG. 6, a prompt message is displayed to notify the user to confirm whether service data is obtained via the base station, since the service fee is generated due to data stream consumption, made by the terminal, of obtaining service data via the base station.

Furthermore, the user is able to confirm obtaining service data via the base station by triggering a pre-set virtual bottom. When the user confirmed obtaining service data via the base station, a first confirmation message is received by the terminal and step 202 is performed by the terminal. A first obtaining request is transmitted, in response to the notification signaling, to the base station to request the base station to transmit the service data to the terminal.

In this embodiment, after the notification signaling, transmitted by the base station, is received by the terminal, which allows the user to confirm whether to obtain service data via the base station. After the user confirmed to obtain the service data via the base station, a first obtaining request, for requesting to obtain service data, is then transmitted, in response to the notification signaling, to the base station. Therefore, since the user is able to confirm whether to obtain service data through the base station, the intelligence level of the terminal and the user experience are improved.

Figure 14:
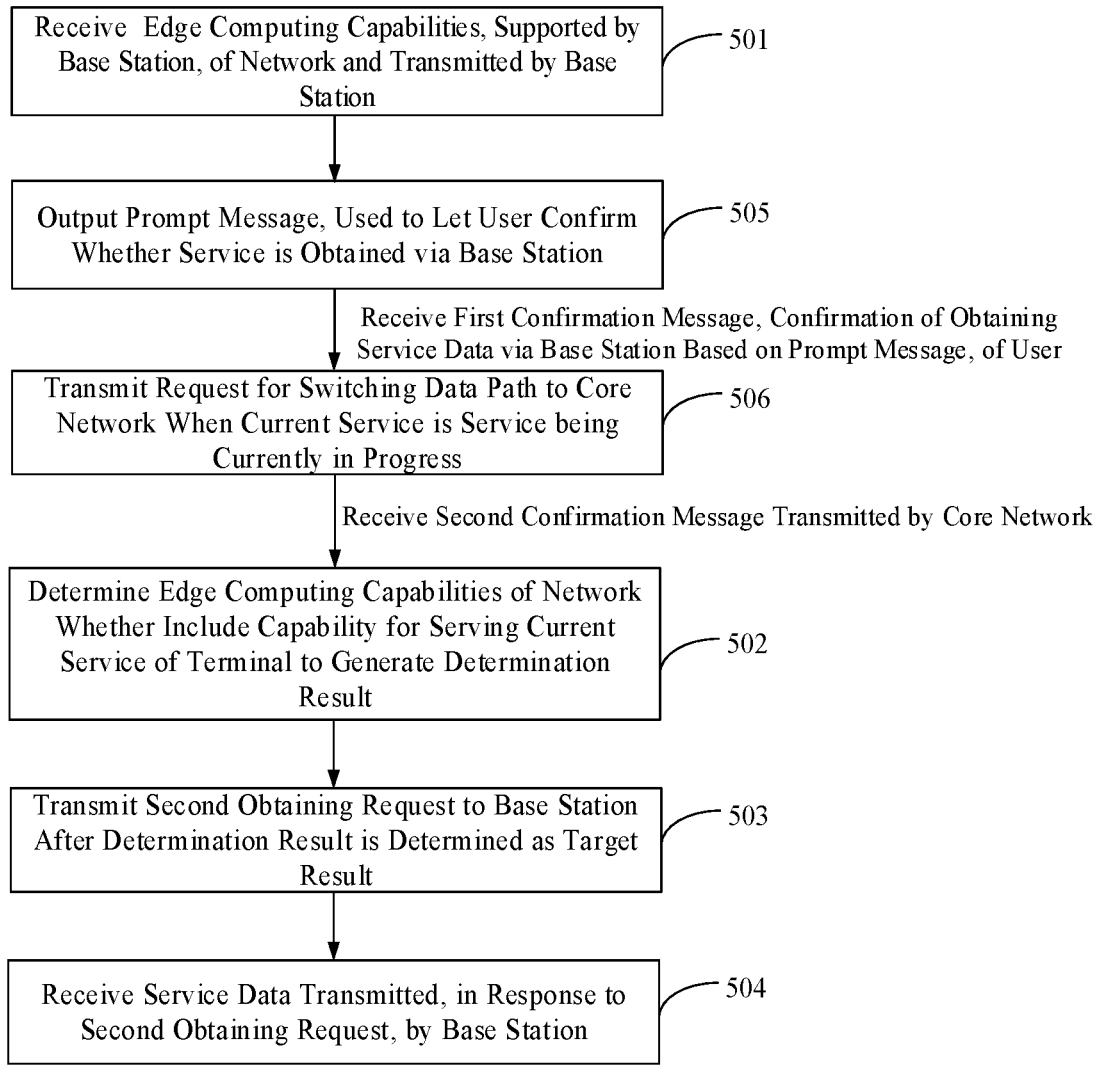
FIG. 14 is a flowchart showing another method for implementing edge computing of a network, according to some embodiments.

FIG. 14 illustrates another method for implementing edge computing of a network of the embodiment of FIG. 13. As shown, after a first confirmation message, a confirmation of obtaining the service data via the base station, of the user which is transmitted in response to the prompt message is received, the method for implementing edge computing of the network further includes the following steps.

In step 506, when the current service is a service being currently in progress, a request for switching the data path is transmitted to the core network.

The request for switching the data path is used to request to switch the data path of obtaining the service data of the terminal to the base station.

In this step, when the current service has started in progress, which means the current service is a service currently in progress, the service data, transmitted by the service server, is received, by the terminal, via the core network.

After the determination result is confirmed as the target result and the service data is confirmed, by the user, to be received by the base station, the request for switching data path is transmitted, by the terminal, to the core network. The request for switching data path is used to request to switch the data path of obtaining the service data of the terminal to the base station.

When the switching of the data path is confirmed, by the core network, in response to the request for switching the data path, a second confirmation message is transmitted, by the core network, to the terminal.

After the second confirmation message, transmitted by the core network, is received by the terminal, the step of transmitting the second request to the base station is then performed. In the meantime, the terminal in no longer receiving data packets transmitted by the core network or transmitting data packet to the core network. The terminal receives data packets carrying service data transmitted, by the base station, in response to the second obtaining request.

In this embodiment, when the current service is a service being currently in progress, a request for switching data path is transmitted, by the terminal, to the core network. After the second confirmation message, transmitted by the core network, is received by the terminal, the service data is then obtained via the base station. Therefore, the targets of providing, by the base station, edge computing service to the terminal and improvement of the pertinence and precision of edge computing of the network is achieved are achieved.

Figure 15:
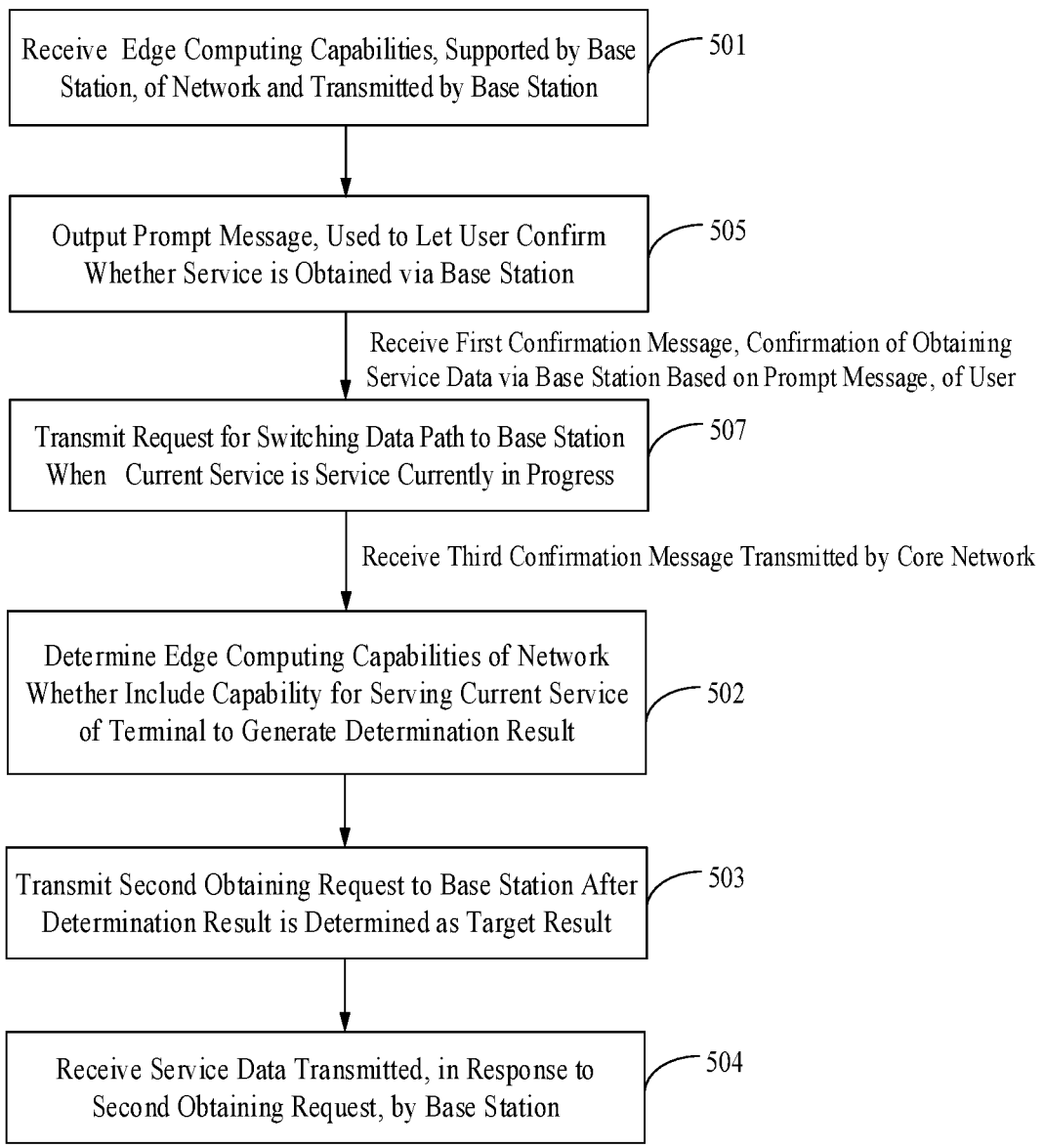
FIG. 15 is a flowchart showing another method for implementing edge computing of a network, according to some embodiments.

FIG. 15 illustrates another method for implementing edge computing of a network of the embodiment of FIG. 13. After a first confirmation message, a confirmation of obtaining the service data via the base station, of the user which is transmitted in response to the notification signaling is received, the method for implementing edge computing of a network further includes the followings.

In step 507, when the current service is a service currently in progress, a request for switching data path is transmitted to the base station. The request for switching data path is used to request to switch the data path, for obtaining the service data, of the terminal to the base station.

In this embodiment of the present disclosure, when the current service has not been started in progress and requests the current service, a currently requesting service, from the base station, the determination result is then confirmed as a target result. After the user confirmed obtaining service data via the base station, a request for switching the data path is transmitted to the base station to request switching the data path of obtaining service data of the terminal to the base station.

When the switching of the data path is confirmed by the base station, a third confirmation message is transmitted, by the terminal, by the base station. After the third confirmation message is received by the terminal, the step of transmitting a second obtaining request to the base station is performed to obtain service data via the base station.

In this embodiment, when the current service is the current requesting service, a request for switching data path is transmitted, by the terminal, to the base station. After the third confirmation message, transmitted by the base station, is received by the terminal, the service data is then obtained via the base station. The target of the base station is capable of transmitting service data to the terminal and the target of providing pertinence and precision services of edge computing of the network is achieved.

Figure 16:
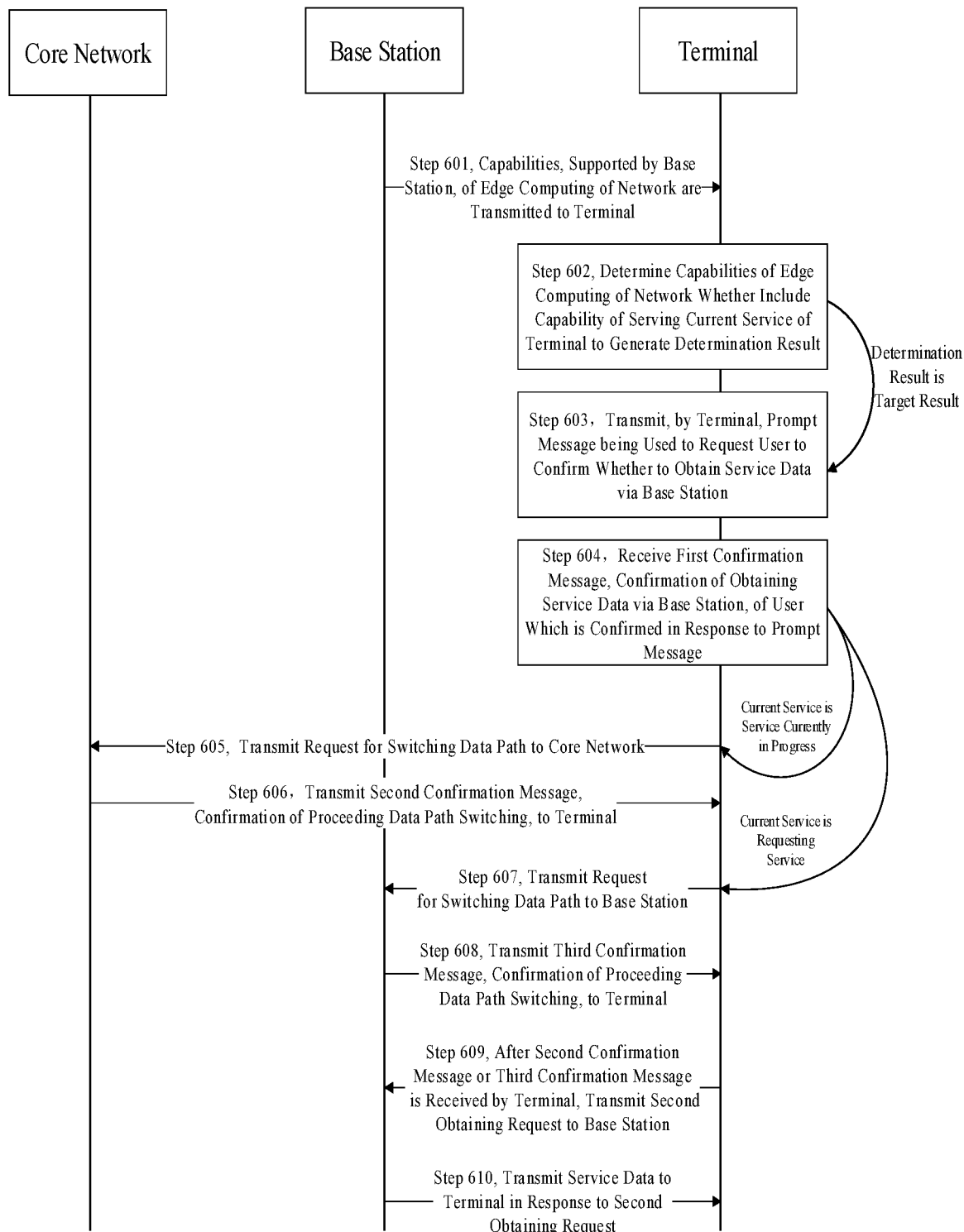
FIG. 16 is a flowchart showing another method for implementing edge computing of a network, according to some embodiments.

In the second aspect of the method for implementing edge computing of the network, FIG. 16 illustrates a flowchart showing another method for implementing edge computing of a network, according to some embodiments. The method of FIG. 16 can further include the following steps.

In step 601, the capabilities, supported by the base station, of edge computing of the network are transmitted to the terminal.

In step 602, the capabilities of edge computing of the network are determined whether include a capability of serving the current service of the terminal to generate a determination result.

The terminal is able to check whether service identification candidates include the current service identification corresponding to the current service and the service identification candidates include all service identifications provided by the capabilities of edge computing of the network.

When the service identification candidates include the current service identification, the determination result is determined as a target result and the step 603 is then performed. Otherwise, the service data is obtained, by the terminal, from the service server.

In step 603, a prompt message, transmitted, by the terminal, is used to request a user to confirm whether to obtain the service data via the base station.

In step 604, a first confirmation message, a confirmation of obtaining the service data via the base station, which is confirmed, in response to the prompt message, by the user is received by the terminal.

When the current service is a service currently in progress, the step 605 is then performed. When the current service is a service being currently requested, the step 607 is then performed.

In step 605, a request for switching data path is transmitted, by the terminal, to the network, wherein the request for switching data path is used to request to switch the data path, for obtaining the service data, of the terminal to the base station.

In step 606, a second confirmation message, a confirmation of switching the data path and transmitted by the core network, is transmitted to the terminal.

In step 607, a request for switching the data path is transmitted, by the terminal, to the base station, wherein the request for switching the data path is used to request to switch the data path, for obtaining the service data, of the terminal to the base station.

In step 608, a third confirmation message, a confirmation of switching the data path, is transmitted, by the base station, to the terminal.

In step 609, after the second confirmation message or the third confirmation message is received by the terminal, a second obtaining request is transmitted to the base station.

In step 610, the service data is transmitted, by the base station, to the terminal in response to the second obtaining request.

In this embodiment, the capabilities, supported by the base station, of edge computing of the network are transmitted to the terminal. The terminal determines whether the capabilities of edge computing of the network include the capability of serving the current service. After the determination result is determined as the target result, the transmissions of the service data of the edge computing are proceeded. The target of implementing edge computing of the network and improving the pertinence and precision of edge computing of the network is achieved.

The foregoing embodiments of the method, for easy understanding, are all described as combinations of series actions, but people who are skilled in the art should understand that the present disclosure is not limited by the described order of actions. According to the present disclosure, some of the steps are performed in other orders or at the same time.

Moreover, people who are skilled in the art should understand that the embodiments in the specification are all optional embodiments. The involved actions and modules are not necessarily required by the present disclosure.

Corresponding to the foregoing application function implementation method embodiment, the present disclosure also provides an application function implementation device and embodiments of the corresponding terminal.

Figure 17:
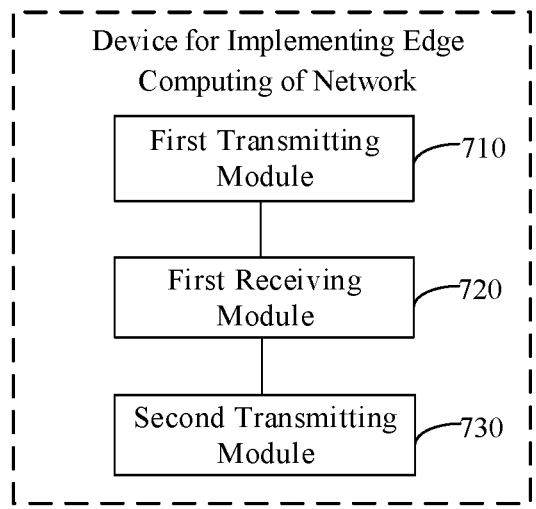
FIG. 17 is a block diagram illustrating a device for implementing edge computing of a network, according to some embodiments.

FIG. 17 is a block diagram illustrating a device for implementing edge computing of a network, according to some embodiments. The device is equipped with a base station and the device includes a first transmitting module 710 configured to transmit a notification signaling to a terminal after a target result is obtained, wherein the notification signaling is used to notify the terminal of the target result and the target result is used to indicate network edge computing capabilities, provided by the base station, including a capability of serving current service of the terminal.

A first receiving module 720 is configured to receive a first obtaining request transmitted, by the terminal, in response to the notification signaling, wherein the first obtaining request is used to obtain service data corresponding to the current service.

A second transmitting module 730 is configured to transmit the service data to the terminal in response to the first obtaining request.

Figure 18:
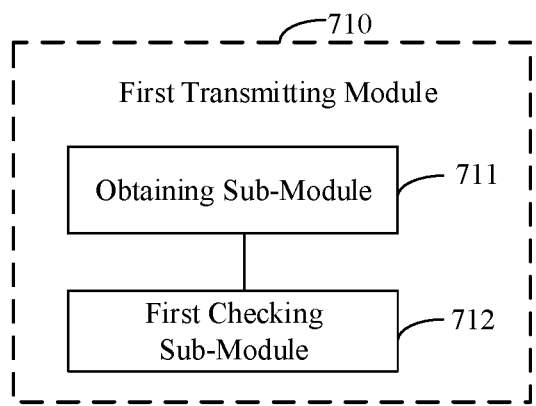
FIG. 18 is a block diagram illustrating a device for implementing edge computing of a network, according to some embodiments.

FIG. 18 is another block diagram illustrating a device for implementing edge computing of a network of the embodiment of FIG. 17.

The first transmitting module 710 includes an obtaining sub-module 711 configured to analyze data packets transmitted, by the terminal, to the base station to obtain a current service identification of the current service corresponding to the current service of the terminal.

A first checking sub-module 712 is configured to check whether service identification candidates including the current service identification of the current service. The target result is obtained when the service identification candidates includes the current service identification of the current service and the service identification candidates includes identifications of services provided by the network edge computing capability.

Figure 19:
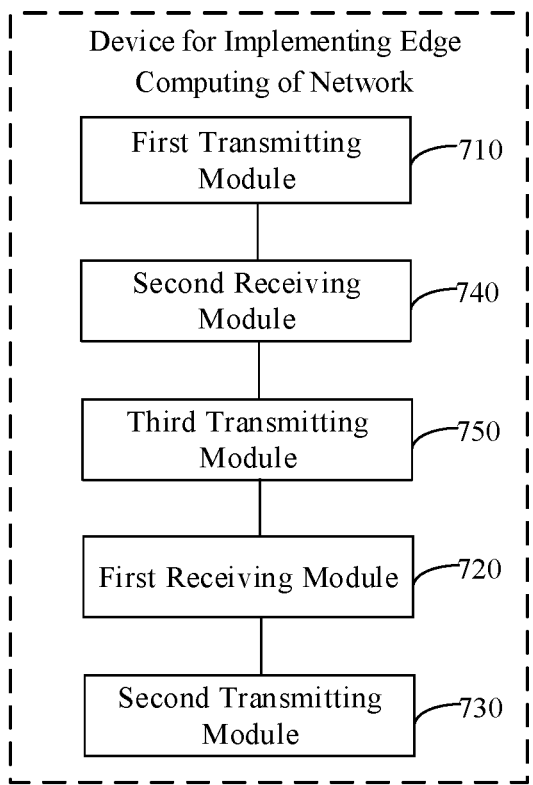
FIG. 19 is a block diagram illustrating a device for implementing edge computing of a network, according to some embodiments.

FIG. 19 is another block diagram illustrating a device for implementing edge computing of a network of the embodiment of FIG. 17.

The device of FIG. 19 further includes second receiving module 740 configured to receive a request for switching data path, wherein the request for switching data path is used to request to switch the data path, for obtaining the service data, of the terminal to the base station.

A third transmitting module 750 is configured to transmit a third confirmation message to the terminal when the data path of obtaining, by the terminal, the service data is confirmed to switch to the base station, wherein after the data path of the service data is allowed to be switched to the base station, a third confirmation message, for switching data path, is transmitted to the terminal and the first obtaining request is then transmitted, by the third transmitting module, to the base station in response to the notification signaling, after the third confirmation message for switching data path is received by the terminal.

Figure 20:
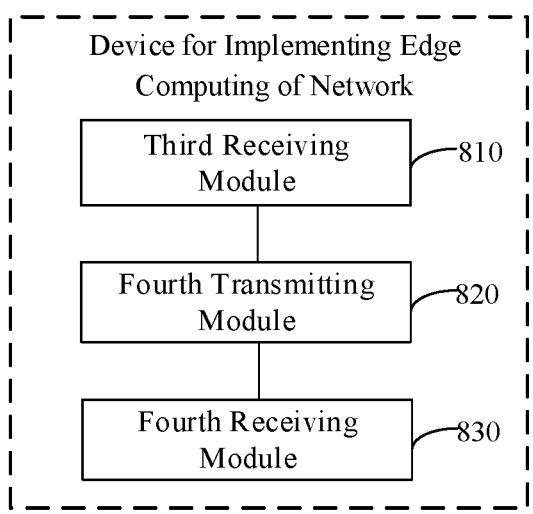
FIG. 20 is a block diagram illustrating a device for implementing edge computing of a network, according to some embodiments.

FIG. 20 is a block diagram illustrating a device for implementing edge computing of a network, according to some embodiments. The device is equipped with a terminal. The device includes a third receiving module 810 configured to receive a notification signaling transmitted by a base station, wherein the notification signaling is used to notify the terminal of the target result and the target result is used to indicate network edge computing capabilities, provided by the base station, including a capability of serving current service of the terminal.

A fourth transmitting module 820 is configured to transmit a first obtaining request to the base station in response to the notification signaling, wherein the first obtaining request is used to request to obtain service data corresponding to the current service.

A fourth receiving module 830 is configured to receive the service data transmitted, by the base station, in response to the first obtaining request.

Figure 21:
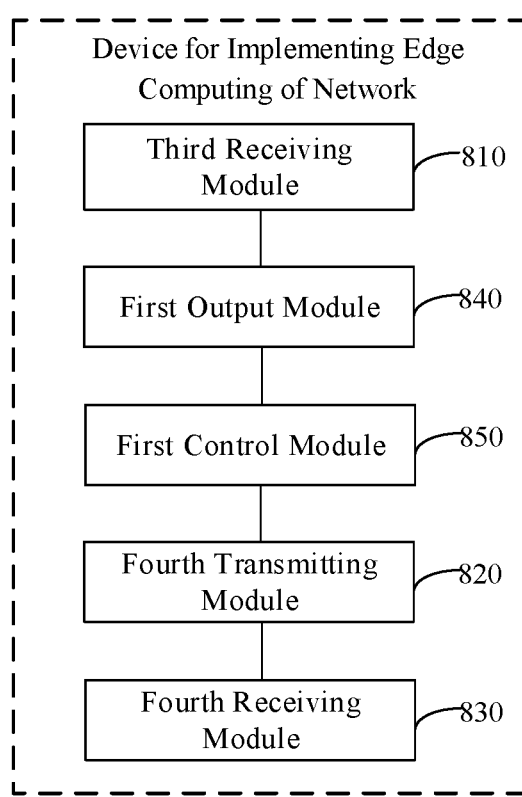
FIG. 21 is a block diagram illustrating a device for implementing edge computing of a network, according to some embodiments.

FIG. 21 is another block diagram illustrating a device for implementing edge computing of a network of the embodiment of FIG. 20. The device further includes a first output module 840 configured to output a prompt message to a user to confirm whether to obtain the service data via the base station.

A first control module 850 is configured to control the fourth transmitting module to transmit, in response to the notification signaling, a first obtaining request to the base station after a first confirmation message, a confirmation of obtaining the service data by the base station, of the user is received by the first control module.

Figure 22:
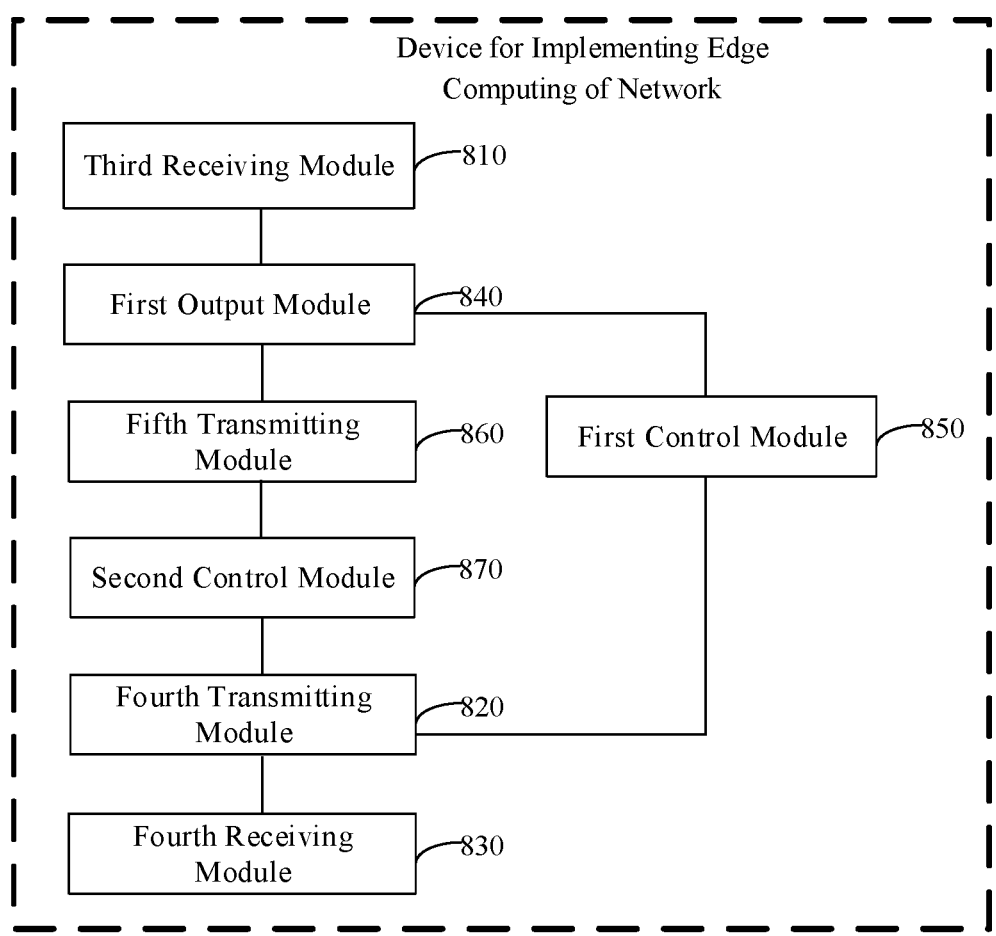
FIG. 22 is a block diagram illustrating a device for implementing edge computing of a network, according to some embodiments.

FIG. 22 is another block diagram illustrating a device for implementing edge computing of a network of the embodiment of FIG. 21. The device further includes a fifth transmitting module 860 configures to transmit a request for switching data path to a core network when the current service is currently in progress, wherein the request for switching data path is used to request to switch the data path, for obtaining the service data, of the terminal to the base station.

A second control module 870 is configured to control the fourth transmitting module to transmit a first obtaining request to the base station after a second confirmation message, a confirmation of performing the step of switching data path, is returned by the core network.

Figure 23:
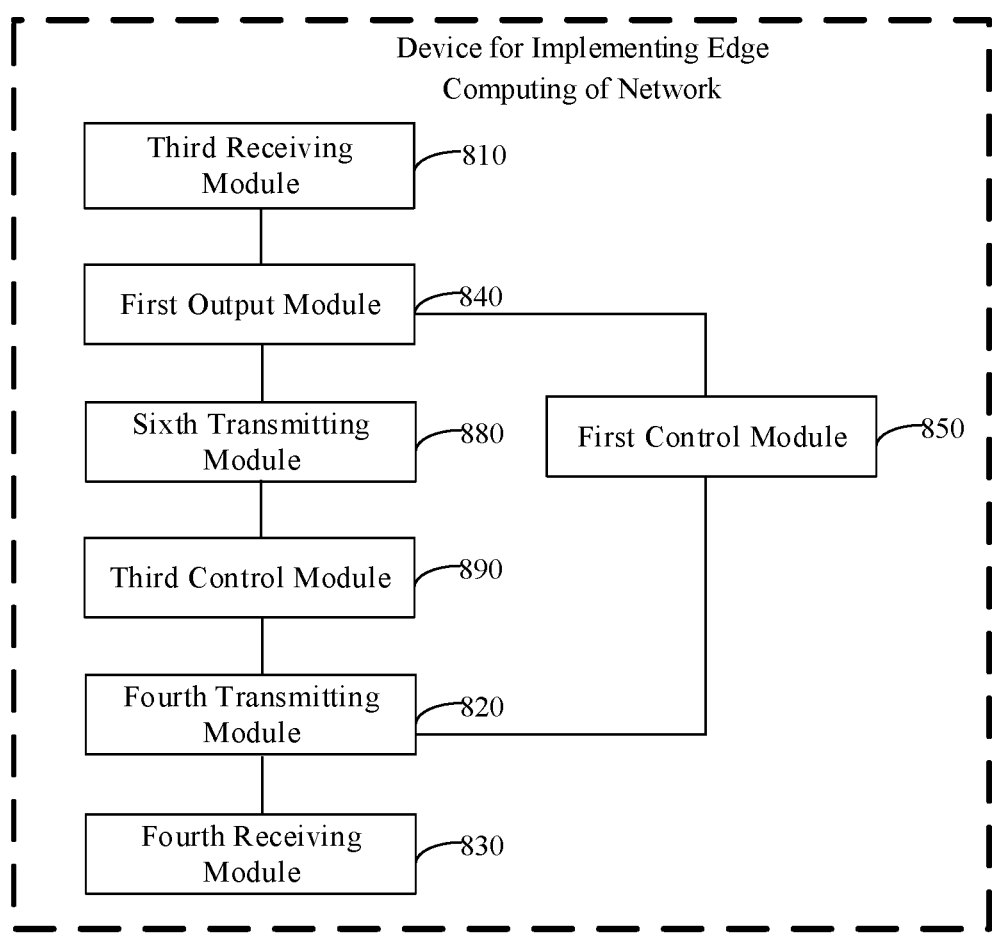
FIG. 23 is a block diagram illustrating a device for implementing edge computing of a network, according to some embodiments.

FIG. 23 is another block diagram illustrating a device for implementing edge computing of a network of the embodiment of FIG. 21. The device further includes a sixth transmitting module 880 configured to transmit a request for switching data path to the base station when the current service including current requesting service, wherein the request for switching data path is used to request to switch the data path, for obtaining the service data, of the terminal to the base station.

A third control module 890 is configured to transmit a first obtaining request to the base station after a third confirmation message, for switching data path, returned by the base station is received by the third control module 890. The fourth transmitting module 820 is controlled to transmit a first obtaining request to the base station in response to the notification signaling.

Figure 24:
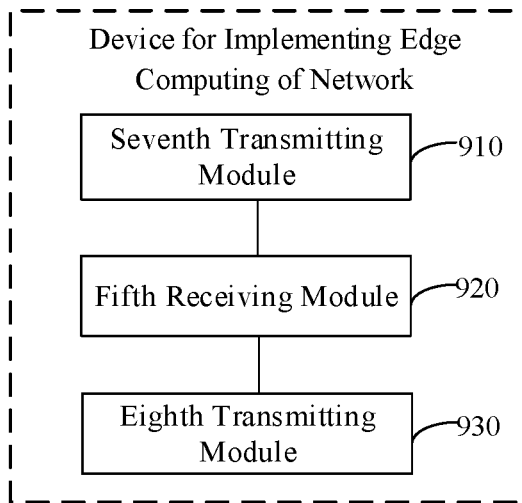
FIG. 24 is a block diagram illustrating a device for implementing edge computing of a network, according to some embodiments.

FIG. 24 is a block diagram illustrating a device for implementing edge computing of a network, according to some embodiments. The device is equipped with a base station. The device includes a seventh transmitting module 910 configured to transmit edge computing capabilities, supported by the base station, of a network to a terminal, wherein the terminal determines whether the edge computing capabilities includes capabilities for providing services of current services of the terminal to generate a determination result.

A fifth receiving module 920 is configured to receive a second obtaining request transmitted by the terminal, wherein the second obtaining request is transmitted after the determination result is confirmed, by the terminal, as a target result and the target result is used to indicate the edge computing capabilities, supported by the base station, including the capabilities for providing services of current services of the terminal, wherein the second obtaining request is used to request service data corresponding to the current service.

An eighth transmitting module 930 is configured to transmit the service data to the terminal in response to the second obtaining request.

Figure 25:
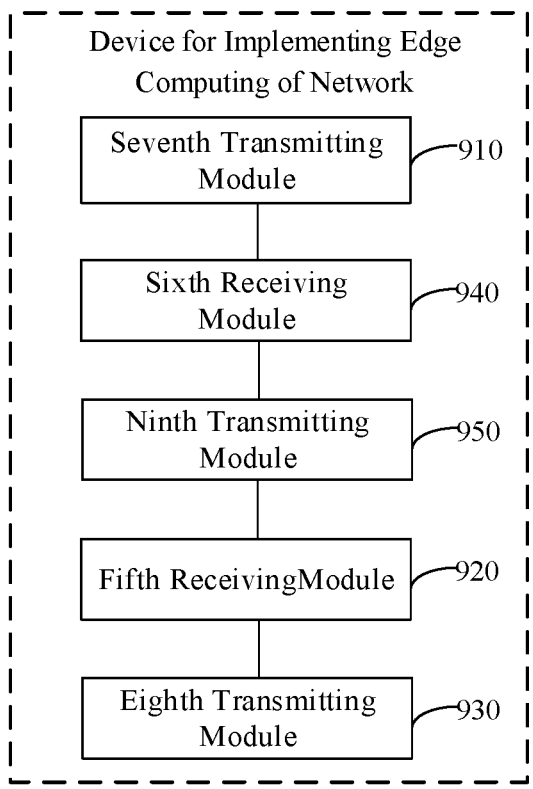
FIG. 25 is a block diagram illustrating a device for implementing edge computing of a network, according to some embodiments.

FIG. 25 is another block diagram illustrating a device for implementing edge computing of a network of the embodiment of FIG. 24. The device further includes a sixth receiving module 940 configured to receive a request, transmitted by the terminal, for switching data path, wherein the request for switching data path is used to request to switch data path, for obtaining the service data, of the terminal to the base station.

A ninth transmitting module 950 is configured to transmit a third confirmation message to the terminal as the data path, for obtaining the service data, of the terminal being confirmed to be switched to the base station and the terminal transmitting a second obtaining request to the base station after the terminal confirmed the determined result as a target result and received the third confirmation message.

Figure 26:
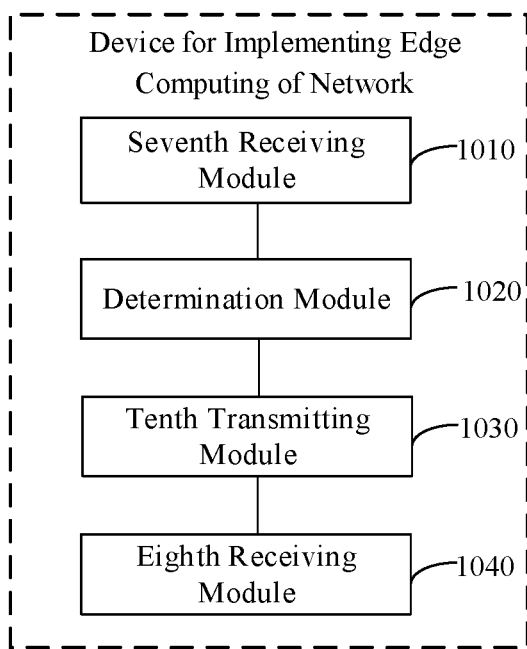
FIG. 26 is a block diagram illustrating a device for implementing edge computing of a network, according to some embodiments.

FIG. 26 is a block diagram illustrating a device for implementing edge computing of a network, according to some embodiments. The device is equipped with a terminal. The device includes a seventh receiving module 1010 configured to receive network edge computing capabilities supported by a base station.

A determination module 1020 is configured to determine whether the network edge computing capabilities including capabilities of serving current services of the terminal and generate a determination result.

A tenth transmitting module 1030 is configured to transmit a second obtaining request to the base station, wherein the target result is used to indicate network edge computing capabilities, provided by the base station, including a capability of serving current service of the terminal.

An eighth receiving module 1040 configured to receive the service data transmitted by the base station and the service data is transmitted in response to the second obtaining request.

Figure 27:
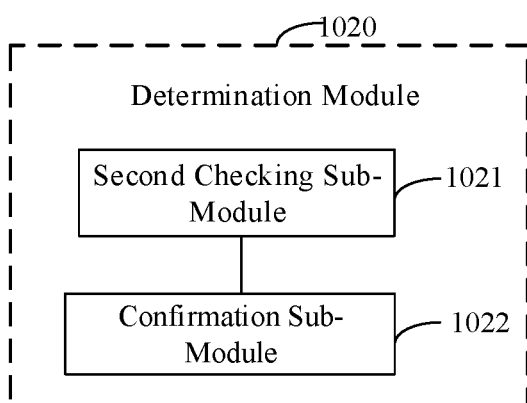
FIG. 27 is a block diagram illustrating a device for implementing edge computing of a network, according to some embodiments.

FIG. 27 is another block diagram illustrating a device for implementing edge computing of a network of the embodiment of FIG. 26. The determination module 1020 includes a second checking sub-module 1021 configured to check whether service identification candidates including the current service identification of the current service, wherein the target result is obtained when the service identification candidates includes the current service identification of the current service and the service identification candidates include identifications of services provided by the network edge computing capability.

A confirmation sub-module 1022 is configured to confirm the determination result as the target result when the service identification candidates include the current service identification of the current service.

Figure 28:
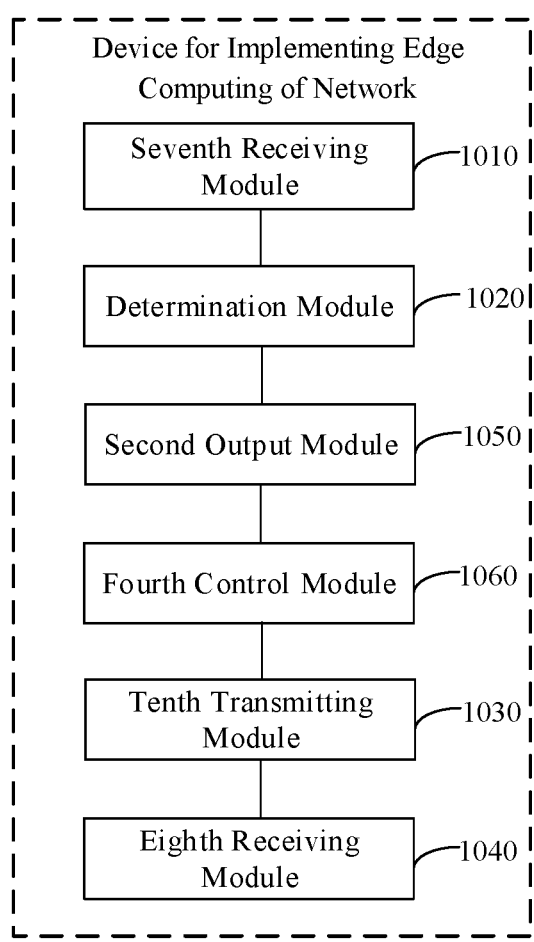
FIG. 28 is a block diagram illustrating a device for implementing edge computing of a network, according to some embodiments.

FIG. 28 is another block diagram illustrating a device for implementing edge computing of a network of the embodiment of FIG. 26. The device further includes a second output module 1050 configured to output a prompt message to request a user to confirm whether the service data is obtained via the base station.

A fourth control module 1060 is configured to control the tenth transmitting module 1030 to transmit a second obtaining request to the base station in response to the received first confirmation message, a confirmation for obtaining the service data via the base station, of the user, wherein the received first confirmation message is generated in response to the prompt message.

Figure 29:
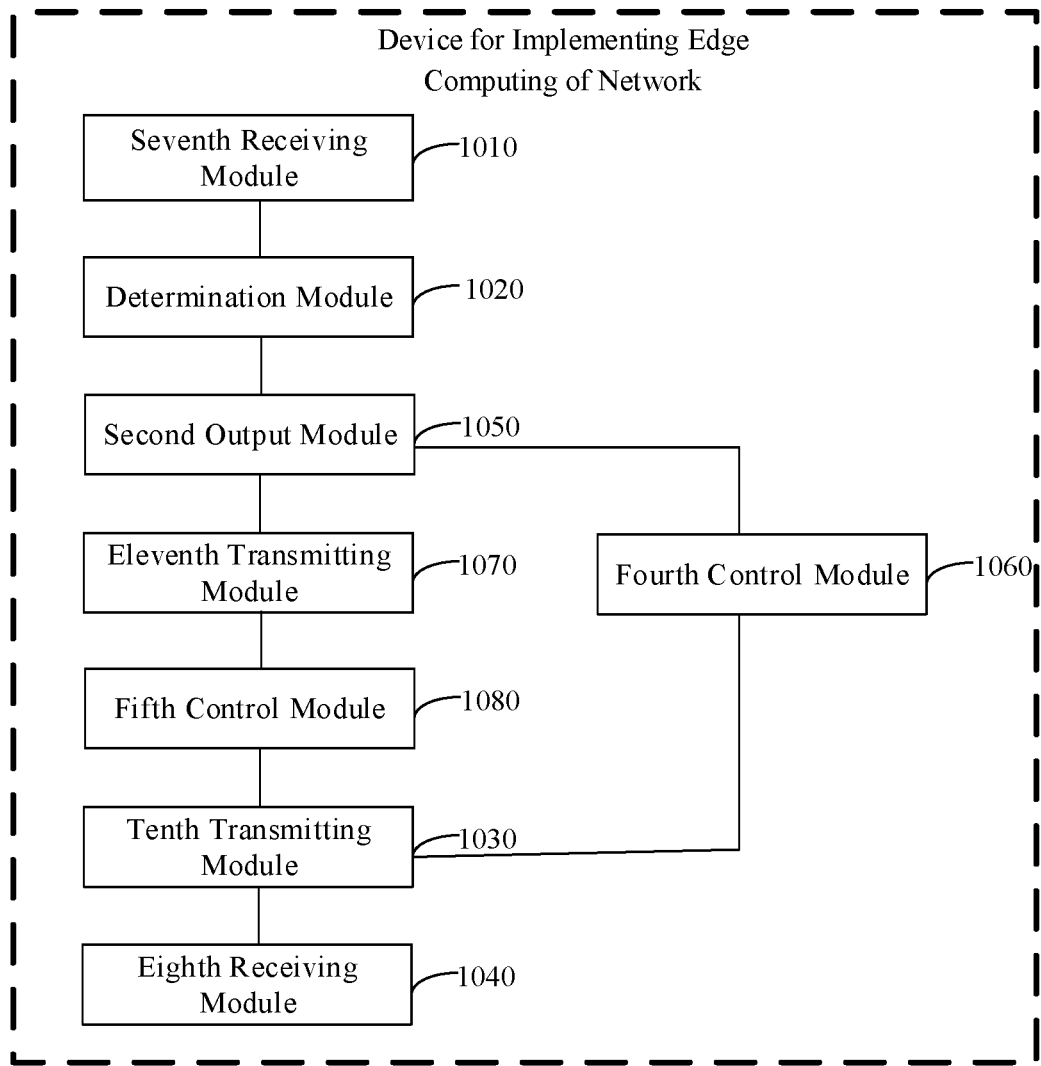
FIG. 29 is a block diagram illustrating a device for implementing edge computing of a network, according to some embodiments.

FIG. 29 is another block diagram illustrating a device for implementing edge computing of a network of the embodiment of FIG. 28. The device further includes an eleventh transmitting module 1070 configured to transmit a request for switching data path to a core network when the current service is currently in progress, wherein the request is used to request to switch data path, for obtaining the service data, of the terminal to the base station.

A fifth control module 1080 is configured to control the tenth transmitting module 1030 to transmit a second obtaining request to the base station after a second confirmation message, a confirmation for switching data path, returned by the core network is received by the fifth control module.

Figure 30:
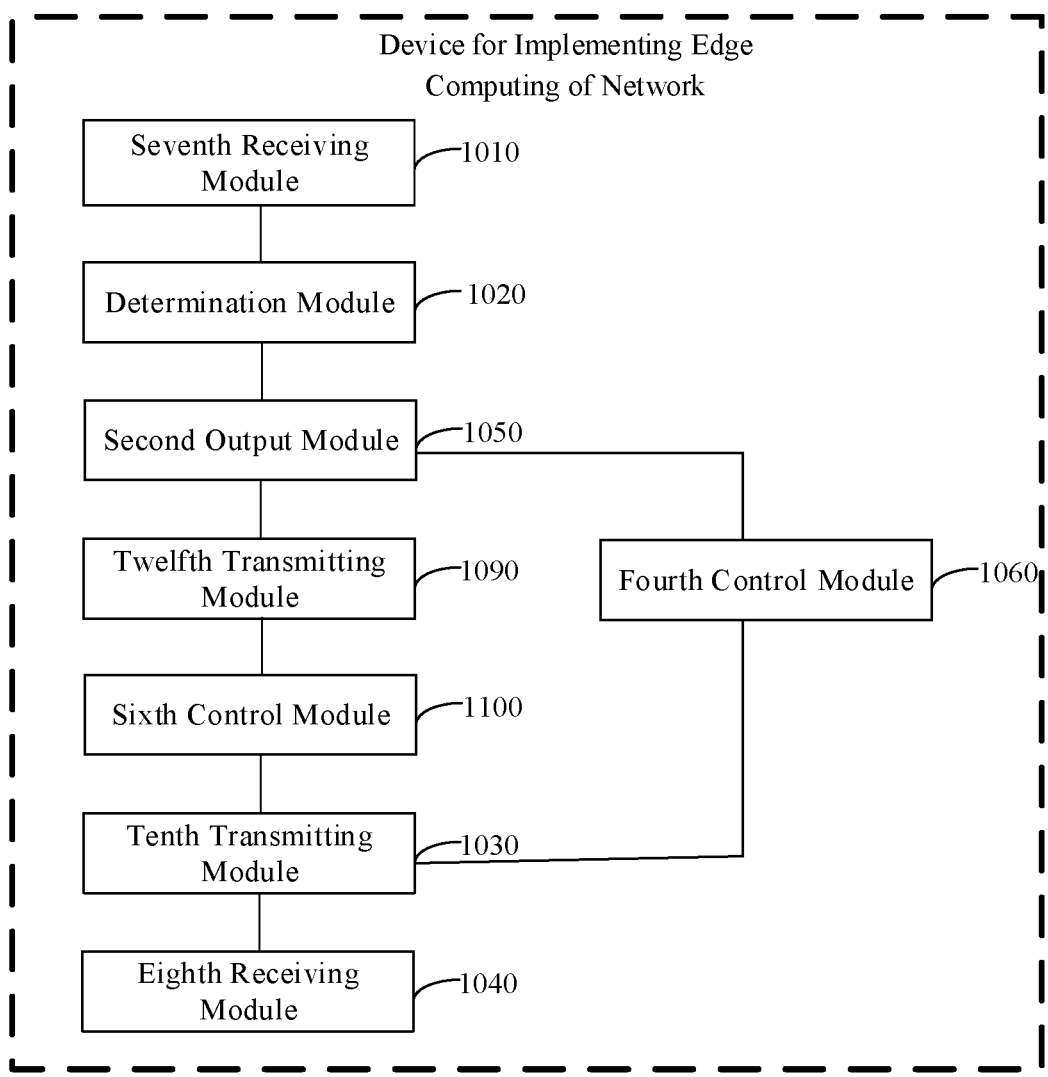
FIG. 30 is a block diagram illustrating a device for implementing edge computing of a network, according to some embodiments.

FIG. 30 is another block diagram illustrating a device for implementing edge computing of a network of the embodiment of FIG. 28. The device further includes a twelfth transmitting module 1090 configured to transmit a request for switching data path to the base station when the current service comprising the current request service, wherein the request is used to request to switch data path, for obtaining the service data, of the terminal to the base station.

A sixth control module 1100 is configured to control the tenth transmitting module 1030 to transmit a second obtaining request to the base station after a third confirmation message, a confirmation for switching data path, returned by the base station is received by the sixth control module.

For the device embodiments, since each of the device embodiments basically correspond to each of the method embodiment. References may be made to the partial description of the method embodiment. The device embodiments are merely illustrative. The units, described as separate components, may or may not be physically separated. The components, displayed as units, may or may not be physical units, which may be located in one place. The components are also deployed into multiple network elements. Some or all of the modules may be selected, according to actual needs, to achieve the objectives of the present disclosure. Person who has ordinary skill in the art is able to understand and apply without any creative effort.

In some embodiments of the present disclosure, there is further provided a non-transitory computer-readable storage medium having stored therein instructions of performing the first aspect of the method for implementing edge computing of the network.

In some embodiments of the present disclosure, there is further provided a non-transitory computer-readable storage medium having stored therein instructions of performing the second aspect of the method for implementing edge computing of the network.

In some embodiments of the present disclosure, there is further provided a non-transitory computer-readable storage medium having stored therein instructions of performing the third aspect of the method for implementing edge computing of the network.

In some embodiments of the present disclosure, there is further provided a non-transitory computer-readable storage medium having stored therein instructions of performing the fourth aspect of the method for implementing edge computing of the network.

In some embodiments of the present disclosure, there is further provided a device for implementing edge computing for a network. The device is equipped with the base station. The device includes a processor and a memory having stored instructions executed by the processor, wherein the processor is configured to transmit a notification signaling to a terminal after obtaining a target result, wherein the notification signaling is used to notify the terminal of the target result and the target result is used to indicate network edge computing capabilities, provided by the base station, including a capability of serving current service of the terminal.

A first obtaining request transmitted, in response to the notification signaling, by the terminal is received.

The service data, in response to the first obtaining request, is transmitted to the terminal.

In some embodiments of the present disclosure, there is further provided a device for implementing edge computing for a network, wherein the device is equipped with a terminal. The device includes a processor and a memory having stored instructions executed by the processor, wherein the processor is configured to receive a notification signaling transmitted by a base station and the notification signaling is used to notify the terminal of the target result and the target result is used to indicate network edge computing capabilities, provided by the base station, including a capability of serving current service of the terminal.

A first obtaining request is transmitted, in response to the notification signaling, to the base station, wherein the first obtaining request is used to request to obtain service data corresponding to the current service.

The service data transmitted, in response to the first obtaining request, is received by the base station.

In some embodiments of the present disclosure, there is further provided a device for implementing edge computing for a network, wherein the device is equipped with a base station. The device includes a processor and a memory having stored instructions executed by the processor, wherein the processor is configured to transmit edge computing capabilities of a network to a terminal which allow the terminal to obtain a determination result by determining whether the edge computing capabilities of a network include a capability of serving the current services.

A second obtaining request, transmitted by the terminal, is received after the determination result being confirmed as a target result, wherein the target result is used to indicate network edge computing capabilities, provided by the base station, including a capability of serving current service of the terminal and the second obtaining request is used to request to obtain service data corresponding to the current service. The service data is transmitted to the terminal in response to the second obtaining request.

In some embodiments of the present disclosure, there is further provided a device for implementing edge computing for a network, wherein the device is equipped with a terminal. The device includes a processor and a memory having stored instructions executed by the processor, wherein the processor is configured to receive edge computing capabilities for a network, supported and transmitted by a base station.

The edge computing capabilities of a network are determined whether includes a capability of serving the current services for the terminal to obtain a determination result.

A second obtaining request is transmitted to the base station after the determination result being confirmed as a target result, wherein the target result is used to indicate that the edge computing capabilities for a network, supported by the base station, include a capability of serving the current service and the second obtaining request is used to request to obtain service data corresponding to the current service.

The service data transmitted, in response to the second obtaining request, by the base station is received.

Figure 31:
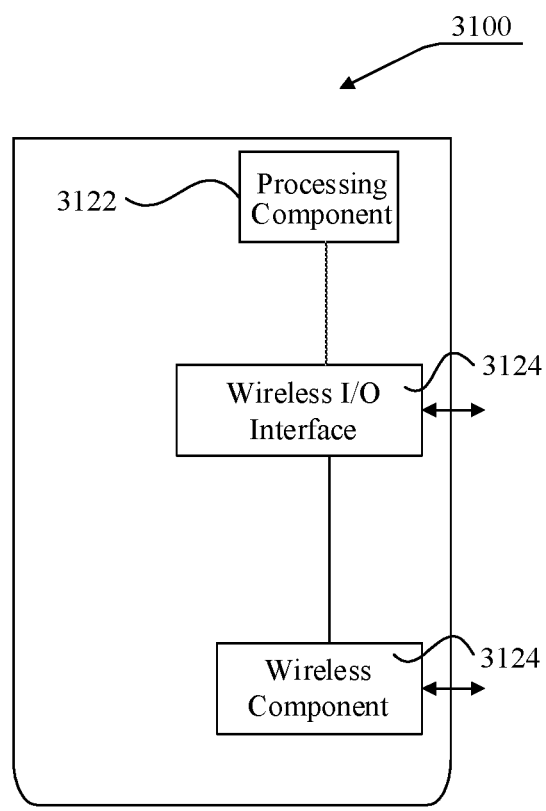
FIG. 31 is a schematic view illustrating a device for implementing edge computing of a network, according to some embodiments.

FIG. 31 is a schematic view illustrating a device 3100 for implementing edge computing of a network, according to some embodiments. The device 3100 is provided as a base station. As shown in FIG. 31, the device 3100 includes a processing component 3122, a wireless input/output (I/O) interface 3124, an antenna component 3126 and the unique signal processing part of the wireless interface. The processing component 3122 further includes one or more processors.

One of the processors of the processing component 3122 is configured to perform any one of the methods, applied on the base station side, for implementing edge computing of the network.

Figure 32:
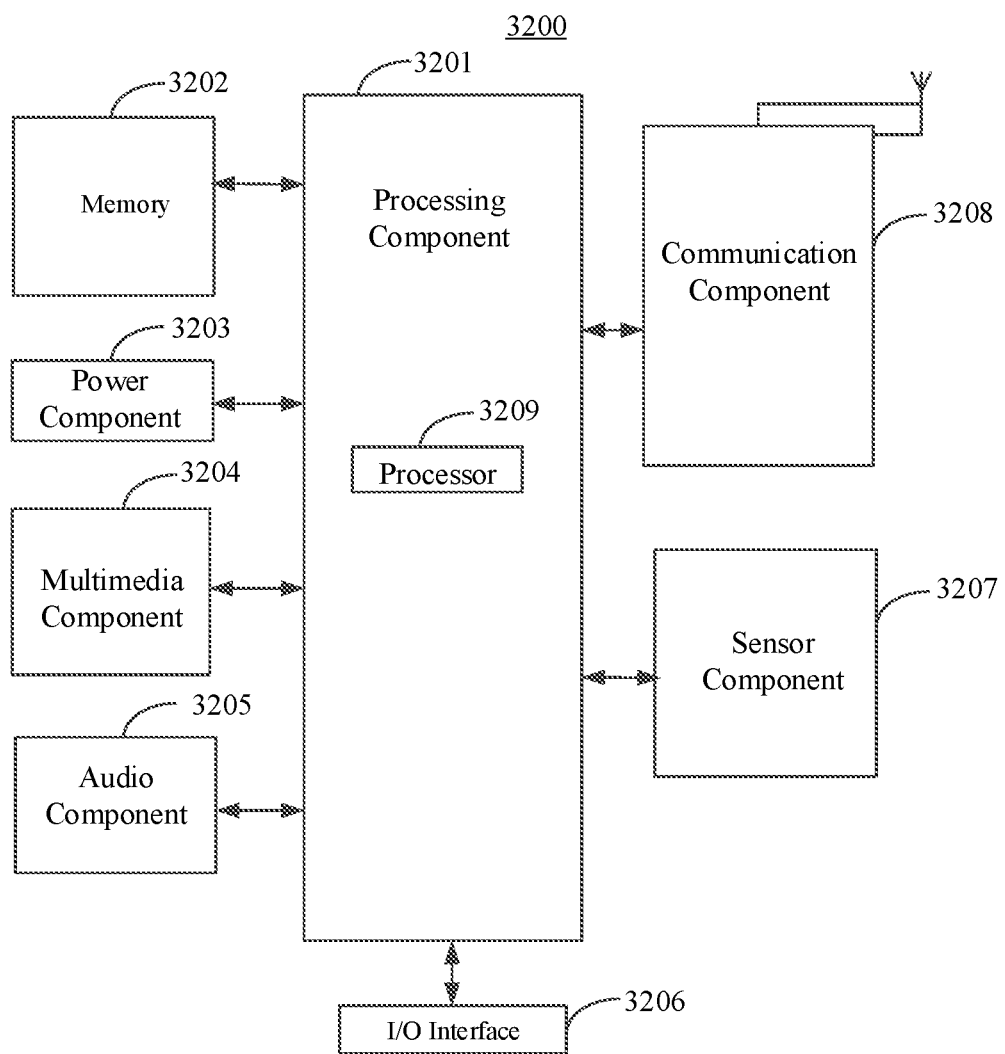
FIG. 32 is another schematic view illustrating a device for implementing edge computing of a network, according to some embodiments.

FIG. 32 is another schematic view illustrating a device for implementing edge computing of a network, according to some embodiments. As shown in FIG. 32, the device 3200 for implementing edge computing of a network according to some embodiments, the device 3200 may be a mobile phone, a computer, a digital broadcast terminal, a messaging device, a gaming console, a tablet, a medical device, exercise equipment, a personal digital assistant, and the like.

As shown in FIG. 32, the device 3200 may include one or more of the following components: a processing component 3201, a memory 3202, a power component 3203, a multimedia component 3204, an audio component 3205, an input/output (I/O) interface 3206, a sensor component 3207, and a communication component 3208.

The processing component 3201 typically controls overall operations of the device 3200, such as the operations associated with display, telephone calls, data communications, camera operations, and recording operations. The processing component 3201 may include one or more processors 3209 to execute instructions to perform all or part of the steps in the above described methods. Moreover, the processing component 3201 may include one or more modules which facilitate the interaction between the processing component 3201 and other components. For instance, the processing component 3201 may include a multimedia module to facilitate the interaction between the multimedia component 3204 and the processing component 3201.

The memory 3202 is configured to store various types of data to support the operation of the device 3200. Examples of such data include instructions for any applications or methods operated on the device 3200, contact data, phonebook data, messages, pictures, video, etc. The memory 3202 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3203 provides power to various components of the device 3200. The power component 3203 may include a power management system, one or more power sources, and any other components associated with the generation, management, and distribution of power in the device 3200.

The multimedia component 3204 includes a screen providing an output interface between the device 3200 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3204 includes a front camera and/or a rear camera. The front camera and the rear camera may receive an external multimedia datum while the device 3200 is in an operation mode, such as a photographing mode or a video mode. Each of the front camera and the rear camera may be a fixed optical lens system or have focus and optical zoom capability.

The audio component 3205 is configured to output and/or input audio signals. For example, the audio component 3205 includes a microphone ("MIC") configured to receive an external audio signal when the device 3200 is in an operation mode, such as a call mode, a recording mode, and a voice recognition mode. The received audio signal may be further stored in the memory 3202 or transmitted via the communication component 3208. In some embodiments, the audio component 3205 further includes a speaker to output audio signals.

The I/O interface 3206 provides an interface between the processing component 3201 and peripheral interface modules, such as a keyboard, a click wheel, buttons, and the like. The buttons may include, but are not limited to, a home button, a volume button, a starting button, and a locking button.

The sensor component 3207 includes one or more sensors to provide status assessments of various aspects of the device 3200. For instance, the sensor component 3207 may detect an open/closed status of the device 3200, relative positioning of components, e.g., the display and the keypad, of the device 3200, a change in position of the device 3200 or a component of the device 3200, a presence or absence of user contact with the device 3200, an orientation or an acceleration/deceleration of the device 3200, and a change in temperature of the device 3200. The sensor component 3207 may include a proximity sensor configured to detect the presence of nearby objects without any physical contact. The sensor component 3207 may also include a light sensor, such as a CMOS or CCD image sensor, for use in imaging applications. In some embodiments, the sensor component 3207 may also include an accelerometer sensor, a gyroscope sensor, a magnetic sensor, a pressure sensor, or a temperature sensor.

The communication component 3208 is configured to facilitate communication, wired or wirelessly, between the device 3200 and other devices. The device 3200 can access a wireless network based on a communication standard, such as WiFi, 2G, or 3G, or a combination thereof. In one exemplary embodiment, the communication component 3208 receives a broadcast signal or broadcast associated information from an external broadcast management system via a broadcast channel. In one exemplary embodiment, the communication component 3208 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 3202, executable by the processor 3209 in the device 3200, for performing the above-described methods. For example, the non-transitory computer-readable storage medium may be a ROM, a RAM, a CD-ROM, a magnetic tape, a floppy disc, an optical data storage device, and the like.

Moreover, when the instructions in the non-transitory computer-readable storage medium are executed by the processor, any one of the methods, applied on the base station side, for implementing edge computing of the network is then performed by the device 3200.

One of ordinary skill in the art will understand that the above-described modules can each be implemented by hardware, or software, or a combination of hardware and software. One of ordinary skill in the art will also understand that multiple ones of the above-described modules may be combined as one module, and each of the above-described modules may be further divided into a plurality of sub-modules.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

In order to solve existing problems in the related technology, there are provided a method for implementing edge computing of a network and a device thereof.

In some embodiments of the present disclosure, there is provided a method for implementing edge computing of a network, which is performed by a base station. The method is comprising the steps of transmitting a notification signaling to a terminal after obtaining a target result, wherein the notification signaling is used to notify the terminal of the target result and the target result is used to indicate network edge computing capabilities, provided by the base station, including a capability of serving current service of the terminal; receiving a first obtaining request transmitted, in response to the notification signaling, by the terminal, wherein the first obtaining request is used to obtain service data corresponding to the current service; and transmitting the service data to the terminal in response to the first obtaining request.

In some embodiments of the present disclosure, there is provided a method for implementing edge computing of a network, which is performed by a terminal. The method is comprising the steps of receiving a notification signaling transmitted by a base station, wherein the notification signaling is used to notify the terminal of the target result and the target result is used to indicate network edge computing capabilities, provided by the base station, including a capability of serving current service of the terminal; transmitting a first obtaining request to the base station in response to the notification signaling, wherein the first obtaining request is used to request obtaining the service data corresponding to the current service; and receiving the service data transmitted, by the base station, in response to the first obtaining request.

In some embodiments of the present disclosure, there is provided a device for implementing edge computing for a network, wherein the device is equipped with a terminal, the device comprises a processor; a memory having stored instructions executed by the processor, wherein the processor is configured to receive a notification signaling transmitted by a base station and the notification signaling is used to notify the terminal of the target result and the target result is used to indicate network edge computing capabilities, provided by the base station, including a capability of serving current service of the terminal; transmitting, in response to the notification signaling, a first obtaining request to the base station, wherein the first obtaining request is used to request to obtain service data corresponding to the current service; receiving the service data transmitted, in response to the first obtaining request, by the base station.

Various embodiments of the present disclosure can have one or more of the following advantages.

In some embodiments of the present disclosure, after a target result is received by a base station, a notification signaling is transmitted to a terminal, wherein the notification signaling is used to notify the terminal of the target result. The target result is used to indicate a network edge computing capability, provided by the base station, including a capability of serving current service of the terminal. A first obtaining request is transmitted, in response to the notification signaling, by the terminal to request to obtain service data corresponding to the current service. The service data is then transmitted, in response to the first obtaining request, to the terminal by the base station. Therefore, the terminal, for processing the service data of edge computing of the network, is then accurately determined by the base station. The target of implementing edge computing of the network and improving the pertinence and precision of edge computing of the network is achieved.

In some embodiments of the present disclosure, optionally, data packets, transmitted by the terminal, are analyzed by the base station to obtain a current service identification of the current service corresponding to the current service of the terminal. When the current service identification is checked in service identification candidates, the target result is then obtained via the base station, wherein the service identification candidates include identifications of services provided by the network edge computing capability. Therefore, in order to provide edge computing service of the network for the terminal later, the base station is capable of accurately determining whether the capabilities, supported by the base station, of edge computing of the network include the capabilities of serving the current service of the terminal.

In some embodiments of the present disclosure, after a request, transmitted by a terminal, for switching data path of the service data, is received by a base station and the data path of the service data is allowed to be switched to the base station, a third confirmation message is transmitted to the terminal. After the third confirmation message is received by the terminal, a first obtaining request is transmitted, in response to a notification signaling, to the base station. The notification signaling is transmitted by the base station and used for notifying the terminal of target result. Therefore, after the switching of the data path is confirmed by the base station, the service data is then obtained via the terminal. The performance of 5G systems is then improved with high availability.

In some embodiments of the present disclosure, after a notification signaling, transmitted by a base station and used for notifying a terminal of target result, is received by the terminal, a first obtaining request is transmitted, in response to the notification signaling, to the notification signaling. The target result is used to indicate a network edge computing capability, provided by the base station, including a capability of serving current service of the terminal. The service data is then transmitted, in response to the first obtaining request, to the terminal by the base station. Therefore, the service data is obtained from the base station based upon the notification signaling transmitted by the base station. The target of edge computing service, provided by the base station, of the network for the terminal is then achieved, and the pertinence and precision of edge computing of the network are then improved.

In some embodiments of the present disclosure, after a notification signaling, transmitted by a base station, is received by a terminal and a confirmation of obtaining service data via the base station is made, a first obtaining request is then transmitted, in response to the notification signaling, to the base station. Moreover, since the user is able to confirm whether to obtain service data through the base station, the intelligence level of the terminal and the user experience are improved.

In some embodiments of the present disclosure, after a first confirmation message returned by a core network or a second confirmation message returned by a base station is received by a terminal, a request for obtaining service data is transmitted to the base station. The performance of 5G system is improved.

In some embodiments of the present disclosure, edge computing capabilities, supported by a base station, of a network are transmitted to a terminal. The edge computing capabilities of the network are determined whether the edge computing capabilities include a capability of serving the current service of the terminal to obtain a determination result. After the determination result is determined, by the terminal, as a target result, a second obtaining request is then transmitted to the base station. Furthermore, after the second obtaining request is received by the base station, the service data is transmitted, in response to the second obtaining request, to the terminal. Moreover, since the terminal is capable of determine whether the edge computing capabilities, supported by the base station, include a capability of serving the current service of the terminal. In the meantime, the target of edge computing of the network is then achieved and the pertinence and precision of edge computing of the network are then improved.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for implementing edge computing of a network and applied a base station, the method comprising:
   transmitting a notification signaling to a terminal after obtaining a target result, wherein the notification signaling is used to notify the terminal of the target result and the target result is used to indicate network edge computing capabilities, provided by the base station, including a capability of serving current service of the terminal;
   receiving a first obtaining request transmitted, in response to the notification signaling, by the terminal, wherein the first obtaining request is used to obtain service data corresponding to the current service; and
   transmitting the service data to the terminal in response to the first obtaining request;
   wherein after the transmitting a notification signaling to a terminal and obtaining a target result, the method further comprises:
   receiving a request for switching data path, wherein the request for switching data path is used to request to switch the data path, for obtaining the service data, of the terminal to the base station; and
   transmitting a third confirmation message to the terminal when the data path of obtaining, by the terminal, the service data is confirmed to switch to the base station;
   wherein after the data path of the service data is allowed to be switched to the base station, a third confirmation message, for switching data path, is transmitted to the terminal and the first obtaining request is then transmitted to the base station in response to the notification signaling, after the third confirmation message for switching data path is received by the terminal.

2. The method of claim 1, wherein the obtaining a target result comprises:
   analyzing data packets transmitted, by the terminal, to the base station to obtain a current service identification of the current service corresponding to the current service of the terminal; and
   checking whether service identification candidates including the current service identification of the current service, wherein the target result is obtained when the service identification candidates includes the current service identification of the current service and the service identification candidates include identifications of services provided by the network edge computing capability.

3. A communication system implementing the method according to claim 1, comprising the base station, wherein the base station is configured to accurately determine the terminal for processing the service data of edge computing of the network, thereby implementing the edge computing of the network and improving pertinence and precision of the edge computing of the network.

4. The communication system of claim 3, wherein the base station is further configured to:
   analyze data packets transmitted by the terminal to obtain a current service identification of a current service corresponding to a current service of the terminal;
   upon the current service identification is checked in service identification candidates, obtain the target result, wherein the service identification candidates include identifications of services provided by the network edge computing capability; and
   accurately determine whether the capabilities, supported by the base station, of edge computing of the network include the capabilities of serving the current service of the terminal, thereby providing edge computing service of the network for the terminal later.

5. The communication system of claim 4, further comprising the terminal, wherein:
   after a request, transmitted by a terminal, for switching data path of the service data, is received by the base station and the data path of the service data is allowed to be switched to the base station, a third confirmation message is transmitted to the terminal;
   after the third confirmation message is received by the terminal, a first obtaining request is transmitted, in response to a notification signaling, to the base station;
   the notification signaling is transmitted by the base station and used for notifying the terminal of target result; and
   after the switching of the data path is confirmed by the base station, the service data is then obtained via the terminal, thereby improving performance of 5G systems with high availability.

6. The communication system of claim 5, wherein:
   after a notification signaling, transmitted by the base station and used for notifying the terminal of target result, is received by the terminal, a first obtaining request is transmitted, in response to the notification signaling, to the notification signaling;
   the target result is configured to indicate a network edge computing capability, provided by the base station, including a capability of serving current service of the terminal; and
   the service data is then transmitted, in response to the first obtaining request, to the terminal by the base station; thereby facilitating the service data being obtained from the base station based upon the notification signaling transmitted by the base station.

7. The communication system of claim 6, wherein:
   after a notification signaling, transmitted by the base station, is received by the terminal and a confirmation of obtaining service data via the base station is made, a first obtaining request is then transmitted, in response to the notification signaling, to the base station; thereby facilitating a user to confirm whether to obtain service data through the base station.

8. The communication system of claim 7, wherein:
   after a first confirmation message returned by a core network or a second confirmation message returned by a base station is received by a terminal, a request for obtaining service data is transmitted to the base station;
   the edge computing capabilities of the network are determined whether the edge computing capabilities include a capability of serving the current service of the terminal to obtain a determination result;

after the determination result is determined, by the terminal, as a target result, a second obtaining request is then transmitted to the base station;

after the second obtaining request is received by the base station, the service data is transmitted, in response to the second obtaining request, to the terminal; and the terminal is capable of determining whether the edge computing capabilities, supported by the base station, include a capability of serving the current service of the terminal.

9. A method for implementing edge computing of a network and applied to a terminal, the method comprising:

receiving a notification signaling transmitted by a base station, wherein the notification signaling is used to notify the terminal of the target result and the target result is used to indicate network edge computing capabilities, provided by the base station, including a capability of serving current service of the terminal;

transmitting a first obtaining request to the base station in response to the notification signaling, wherein the first obtaining request is used to request obtaining the service data corresponding to the current service; and receiving the service data transmitted, by the base station, in response to the first obtaining request;

wherein after the receiving a notification signaling, transmitted by the base station, the method further comprises:

outputting a prompt message to a user to confirm whether to obtain the service data via the base station;

wherein after a first confirmation message, a confirmation of performing the step of obtaining the service data via the base station, of the user is received, the notification signaling is executed to perform the step of transmitting a first obtaining request;

wherein after the receiving the first confirmation message, a confirmation of performing the step of obtaining the service data via the base station, of the user, the method further comprises:

transmitting a request for switching data path to the base station when the current service includes the current requesting service, wherein the request for switching data path is used to request to switch the data path, for obtaining the service data, of the terminal to the base station;

wherein after a third confirmation message, a confirmation of performing the step of switching data path, is returned by the core network, the step of transmitting a first obtaining to a base station is performed in response to the notification signaling.

10. The method of claim 9, wherein after the receiving the first confirmation message, a confirmation of performing the step of obtaining the service data via the base station, of the user, the method further comprises:

transmitting a request for switching data path to a core network when the current service is currently in progress, wherein the request for switching data path is used to request to switch the data path, for obtaining the service data, of the terminal to the base station;

wherein after a second confirmation message, a confirmation of performing the step of switching data path, is returned by the core network, the step of transmitting a first obtaining to a base station is performed in response to the notification signaling.

11. A device for implementing edge computing for a network, wherein the device is equipped with a terminal, and the device comprises:

a processor;

memory having stored instructions for execution by the processor to implement operations including:

receiving a notification signaling transmitted by a base station and the notification signaling is used to notify the terminal of the target result and the target result is used to indicate network edge computing capabilities, provided by the base station, including a capability of serving current service of the terminal;

transmitting, in response to the notification signaling, a first obtaining request to the base station, wherein the first obtaining request is used to request to obtain service data corresponding to the current service; and receiving the service data transmitted, in response to the first obtaining request, by the base station;

wherein after the notification signaling, transmitted by the base station, the processor is configured to output a prompt message to a user to confirm whether to obtain the service data via the base station;

wherein after a first confirmation message, a confirmation of performing the step of obtaining the service data via the base station, of the user is received, the notification signaling is executed to perform the step of transmitting a first obtaining request;

wherein after the first confirmation message, a confirmation of performing the step of obtaining the service data via the base station, of the user is received, the processor is configured to transmit a request for switching data path to the base station when the current service includes the current requesting service, wherein the request for switching data path is used to request to switch the data path, for obtaining the service data, of the terminal to the base station;

wherein after a third confirmation message, a confirmation of performing the step of switching data path, is returned by the core network, the step of transmitting a first obtaining to a base station is performed in response to the notification signaling.

12. The device of claim 11, wherein after the first confirmation message, a confirmation of performing the step of obtaining the service data via the base station, of the user is received, the processor is configured to transmit a request for switching data path to a core network when the current service is currently in progress, wherein the request for switching data path is used to request to switch the data path, for obtaining the service data, of the terminal to the base station;

wherein after a second confirmation message, a confirmation of performing the step of switching data path, is returned by the core network, the step of transmitting a first obtaining to a base station is performed in response to the notification signaling.

13. A device for implementing edge computing for a network, wherein the device is equipped with a base station, the device comprises:

a processor;

memory having stored instructions for execution by the processor, to implement operations including:

transmit edge computing capabilities of a network to a terminal which allow the terminal to obtain a determination result by determining whether the edge computing capabilities of a network include a capability of serving the current services;

receiving a second obtaining request transmitted by the terminal after the determination result being confirmed as a target result, wherein the target result is used to indicate a network edge computing capability, provided by the base station, including a capability of serving current service of the terminal and the second obtaining request is used to request to obtain service data corresponding to the current service; and transmitting, in response to the second obtaining request, the service data to the terminal;

wherein after the determination result is confirmed as a target result, a notification signaling is transmitted to the terminal and the processor is configured to receiving a request for switching data path, wherein the request for switching data path is used to request to switch the data path, for obtaining the service data, of the terminal to the base station;

transmitting a third confirmation message to the terminal when the data path of obtaining, by the terminal, the service data is confirmed to switch to the base station;

wherein after the data path of the service data is allowed to be switched to the base station, a third confirmation message, for switching data path, is transmitted to the terminal and the first obtaining request is then transmitted to the base station in response to the notification signaling, after the third confirmation message for switching data path is received by the terminal.

14. The device of claim 13, wherein after the determination result being confirmed as a target result, the processor is configured to analyze data packets transmitted, by the terminal, to the base station to obtain a current service identification of the current service corresponding to the current service of the terminal and check whether service identification candidates including the current service identification of the current service, wherein the target result is obtained when the service identification candidates includes the current service identification of the current service and the service identification candidates include identifications of services provided by the network edge computing capability.

* * * * *